US012518648B2

(12) United States Patent
Agley et al.

(10) Patent No.: US 12,518,648 B2
(45) Date of Patent: *Jan. 6, 2026

(54) EDUCATIONAL AND CONTENT RECOMMENDATION MANAGEMENT SYSTEM

(71) Applicant: OBRIZUM GROUP LTD., Cambridge (GB)

(72) Inventors: Chibeza Chintu Agley, Cambridge (GB); Matthew Jonathan Chadwick, Stroud (GB); Juergen Fink, Cambridge (GB); Sarra Achouri, Cambridge (GB)

(73) Assignee: OBRIZUM GROUP LTD., Cambridge (GB)

( * ) Notice: Subject to any disclaimer, the term of this patent is extended or adjusted under 35 U.S.C. 154(b) by 510 days.

This patent is subject to a terminal disclaimer.

(21) Appl. No.: 17/973,136

(22) Filed: Oct. 25, 2022

(65) Prior Publication Data

US 2023/0045037 A1 Feb. 9, 2023

Related U.S. Application Data

(63) Continuation of application No. 16/918,213, filed on Jul. 1, 2020, now Pat. No. 11,514,809.

(Continued)

(30) Foreign Application Priority Data

Jun. 29, 2020 (EP) .................................... 20182915

(51) Int. Cl.
*G06F 15/18* (2006.01)
*G06F 16/901* (2019.01)
(Continued)

(52) U.S. Cl.
CPC .......... *G09B 7/08* (2013.01); *G06F 16/9024* (2019.01); *G06N 5/02* (2013.01); *G06N 5/04* (2013.01);
(Continued)

(58) Field of Classification Search
CPC .... G09B 7/08; G09B 7/04; G09B 7/02; G06F 16/9024; G06N 5/02; G06N 5/04; G06N 7/01; G06N 20/00; G06Q 50/20
See application file for complete search history.

(56) References Cited

U.S. PATENT DOCUMENTS 9,183,173 B2 * 11/2015 Yih ..................... G06N 20/00
10,033,727 B1 * 7/2018 Fieldman ........... G06Q 30/0635
(Continued)

OTHER PUBLICATIONS

"Examination Report for EP Appl. No. 20182915.7, mailed Jun. 6, 2024".

(Continued)

*Primary Examiner* — Masud Ahmed
(74) *Attorney, Agent, or Firm* — Dorsey & Whitney LLP

(57) ABSTRACT

A method of delivering educational content to a user includes accessing a first content item of a plurality of content items based on a knowledge base, where the knowledge base includes a graph structure with a plurality of nodes associated with the plurality of content items. The method further includes providing the first content item to a user on a display and receiving one or more user assessment variables based on a response of the user to the first content item. A second content item of the plurality of content items is recommended based on the one or more user assessment variables and the knowledge base. The method further includes accessing the second content item recommended by the node and displaying the second content item of the display.

19 Claims, 15 Drawing Sheets

Related U.S. Application Data

(60) Provisional application No. 62/870,576, filed on Jul. 3, 2019.

(51) Int. Cl.

| | | |
|---|---|---|
| *G06N 5/02* | (2023.01) | |
| *G06N 5/04* | (2023.01) | |
| *G06N 7/01* | (2023.01) | |
| *G06N 20/00* | (2019.01) | |
| *G06Q 50/20* | (2012.01) | |
| *G09B 7/04* | (2006.01) | |
| *G09B 7/08* | (2006.01) | |
| *G09B 7/02* | (2006.01) | |

(52) U.S. Cl.
CPC ............... *G06N 7/01* (2023.01); *G06N 20/00* (2019.01); *G06Q 50/20* (2013.01); *G09B 7/04* (2013.01); *G09B 7/02* (2013.01)

(56) References Cited

U.S. PATENT DOCUMENTS

| | | | |
|---|---|---|---|
| 10,250,614 B2 * | 4/2019 | Fieldman | G09B 5/02 |
| 10,540,907 B2 * | 1/2020 | Breed | G02B 27/017 |
| 11,138,899 B2 | 10/2021 | Agley et al. | |
| 11,514,809 B2 | 11/2022 | Agley et al. | |
| 2014/0272914 A1 | 9/2014 | Baraniuk et al. | |
| 2015/0193651 A1 * | 7/2015 | Gleim | G06V 40/172 |
| | | | 382/118 |
| 2016/0035233 A1 * | 2/2016 | Breed | G06F 1/1656 |
| | | | 324/658 |
| 2016/0307451 A1 * | 10/2016 | Logan | H04L 65/756 |
| 2017/0132288 A1 * | 5/2017 | Ho | G06F 16/243 |
| 2017/0161279 A1 * | 6/2017 | Franceschini | G06N 5/022 |
| 2017/0263141 A1 * | 9/2017 | Possick | G09B 7/00 |
| 2017/0278417 A1 | 9/2017 | Ur et al. | |
| 2020/0301150 A1 * | 9/2020 | Breed | G02B 27/0172 |
| 2021/0005099 A1 | 1/2021 | Agley et al. | |
| 2021/0217323 A1 | 7/2021 | Agley et al. | |

OTHER PUBLICATIONS

"Extended European Search Report mailed Sep. 24, 2020, in European Application No. 20182915.7, 7 pages".

"GB Examination Report for Appl. No. 2008525.4", mailed Feb. 15, 2021.

* cited by examiner

1. The central dogma of molecular genetics states that the genetic information flows from ○ Amino acids ▶ Proteins ▶ DNA ○ DNA ▶ Carbohydrates ▶ Proteins ● DNA ▶ RNA ▶ Proteins ○ DNA ▶ RNA ▶ Carbohydrates Confidence Level  |————————|
                         0%      100%

2. During cell growth, DNA synthesis takes place in

● S phase

○ G1 phase

○ G2 phase

○ M phase

Confidence Level  |————————|
                         0%      100%

EDUCATIONAL AND CONTENT RECOMMENDATION MANAGEMENT SYSTEM

PRIORITY

This application is a continuation of U.S. patent application Ser. No. 16/918,213, filed Jul. 1, 2020 entitled "Educational and Content Recommendation Management System," which claims priority to U.S. Provisional Patent Application No. 62/870,576, filed Jul. 3, 2019 entitled "Educational and Content Recommendation Management System" and European Patent Application No. 20182915.7, filed Jun. 29, 2020 entitled "Educational and Content Recommendation Management System," all of which are hereby incorporated by reference herein in their entirety and for all purposes.

FIELD

The present disclosure relates generally to learning and recommendation systems and examples of assessing knowledge of a user and recommending new content based on the assessment.

BACKGROUND

In connection with verification of training, applications such as online education, identification verification, market research, medical assessments and clinical trials, require users to provide answers to questions, as a form of competence testing or self-reporting. Traditional methods of testing, such as providing questions that pertain to a broad range of topics but without great detail, are susceptible to being circumvented by the users. For example, a user may guess a certain percentage of answers correctly with an additional chance of scoring much higher. A user may also query search engines on the Internet, or search publicly-accessible records to research answers to questions, rather than using his or her own knowledge. These traditional methods typically capture limited information that is mainly restricted to whether or not an answer to a given question is correct. Such methods may therefore not be sufficient to accurately assess a user's real world aptitude for a given task or a user's knowledge or competence in learning certain knowledge.

Further, many companies or other entities, may need to rely on a potential employee or an actual employee's statements regarding his or her own knowledge base, level of competence, level of compliance, or other factual information, which may be inaccurate or at the least imprecise with respect to detailed strengths and weaknesses in a specific topics or task, etc. For example, while an employee may have a generally strong knowledge of certain processes within the company (e.g., a fermentation process), the employee may lack specific knowledge of more specific topics related to the high level topics (e.g., genetic makeup of yeast used in fermentation processes). Conventional company knowledge assessment tools make it difficult to detect and then improve in more specific topic knowledge for employees. Relatedly, conventional learning and training tools utilized by companies and other entities do not interrelate in a manner that dynamically expands or varies learning content based on a person's expanding knowledge base, skill sets, know-how, and job duty variation.

SUMMARY

An example method of delivering educational content to a user is disclosed herein. The method includes accessing a first content item of a plurality of content items based on a knowledge base, where the knowledge base includes a graph structure with a plurality of nodes associated with the plurality of content items. The method further includes providing the first content item to a user on a display and receiving one or more user assessment variables based on a response of the user to the first content item. A second content item of the plurality of content items is recommended based on the one or more user assessment variables and the knowledge base. The method further includes accessing the second content item recommended by the node and displaying the second content item of the display.

In some examples, the plurality of content items may be stored in a content database and the method may further include accessing the content database to generate the knowledge base based on the content database.

In some examples, the method may further include accessing the plurality of content items from the content database, forming a corpus based on the plurality of content items, and generating a probability model of the content items. The method may further include using the probability model to generate the knowledge base by generating one or more of the plurality of nodes of the knowledge base, where each node of the plurality of nodes represents a topic and generating edges amongst the plurality of nodes of the graph structure, where each edges connects a respective first node and second node of the plurality of nodes, where each edge includes a weight representing a probability of the respective first node and second node belonging to the same concept.

In some examples, the probability model may be a latent Dirichlet allocation (LDA) model.

In some examples, recommending the second content item may include accessing the knowledge base, generating a user model based on the one or more user assessment variables, using the user model to navigate the knowledge base to determine a node of the plurality of nodes in the knowledge base, accessing the content represented by the determined node, and recommending the second content item based on the content.

In some examples, recommending the second content item may further include determining the second content item from a plurality of candidate content items, where the second content item is associated with a maximum probability of success among the candidate content items, where the probability of success associated with a respective content item represents a probability that the user will respond to the respective content item correctly.

In some examples, the first content item may be a portion of a video segment, and the method may further include determining one or more concepts within the video segment and mapping a concept of the one or more concepts to a time interval of the video segment, where the time interval of the video segment defines the portion of the video segment.

In some examples, the first content item may be associated with the concept, where accessing the first content item includes accessing the portion of the video segment based on the time interval mapped to the content.

An example recommender system disclosed herein includes a processing device and a computer readable medium containing programming instructions. When executed, the programming instructions cause the processing device to access a knowledge base, obtain one or more user assessment variables, generate a user model based on the one or more user assessment variables, use the user model to navigate the knowledge base to determine a node in the knowledge base, access a content item represented by the determined node, and recommend the content item.

In some examples of the recommender system, the knowledge base may include a graph structure with a plurality of nodes including the node, where the plurality of nodes represent a plurality of content items including the content item.

In some examples of the recommender system, the graph structure may further include edges amongst the plurality of nodes of the graph structure, where each edge connects a respective first node and second node of the plurality of nodes, where each edge includes a weight representing a probability of the respective first node and second node belonging to the same concept.

In some examples of the recommender system, the user model may be a state of a user, where the state of the user includes a plurality of states corresponding to the user assessment variables.

In some examples of the recommender system, the instructions may further cause the processing element to present the content item to the user and update the user model based on input from the user while the content item is presented to the user.

In some examples of the recommender system, the instructions may further cause the processing element to update the user model based on one or more engagement characteristics detected from the input from the user while the user engages with the content item.

In some examples of the recommender system, the instructions may further cause the processing element to use the updated user model to navigate the knowledge base to determine a second node in the knowledge base, access a second item represented by the second node, and present the second content item to the user.

An example method of delivering educational content to a user is disclosed. The method includes displaying, at a user interface, a first content item of the plurality of content items, where the first content item is represented by a first node of a plurality of nodes in a knowledge base, where the plurality of nodes in the knowledge base represent the plurality of content items. The method further includes determining, from user input received at the user interface during display of the first content item, one or more user assessment variables and updating a user model using the one or more user assessment variables. The method further includes determining a second node of the plurality of nodes in the knowledge base based on the updated user model and displaying, at the user interface, a second content item being represented by the second node.

In some examples, the input received at the user interface may include a reported confidence of the user in answering a question of the first content item.

In some examples, the reported confidence may be provided via a slider provided at the user interface.

In some examples, the model may be further updated based on one or more engagement characteristics detected from the input from the user while the user engages with the content item.

In some examples, the user model may be a model of a state of a user, including a plurality of states corresponding to the user assessment variables.

In an aspect of the disclosure, a system for delivering educational content to a user includes a user knowledge assessor and a recommender in communication with each other. The user knowledge assessor is configured to receive one or more user assessment variables based on a user's response to a first content item of a content database, the content database comprising a plurality of content items. The recommender is configured to recommend a second content item based on the one or more user assessment variables for displaying to the user.

In some examples, the contextualizer is configured to access the content database to generate a knowledge base based on the content database, wherein the knowledge base comprises a plurality of nodes and edges.

In some examples, the contextualizer is configured to: access the plurality of content items from the content database; form a corpus based on plurality of the content items; generate a probability model of the content items; and use the probability model to generate the knowledge base. In an example, generating the knowledge base includes generating one or more nodes of knowledge base, each node representing a topic; and generating edges amongst the nodes of the graph, each edge connecting a first node and a second node and including a weight representing a probability of the first node and the second node belonging to a same concept. In an example, the probability model is a latent Dirichlet allocation (LDA) model.

In some examples, the recommender is configured to: access the knowledge base; generate a user model based on the one or more user assessment variables; use the user model to navigate the knowledge base to determine a node in the knowledge base; access content represented by the determined node; and recommend the second content item based on the content.

In some examples, the one or more user assessment variables comprise one or more of a veracity related to the first content item, a response time of the user responding to the first content item, or a confidence value of the user responding to the first content item. Examples of veracity may include a probability that the user will accurately select all the correct answer options for the first content item.

In some examples, the recommender is further configured to: determine a user score based on the user's response to at least the first content item and the second content item; and recommend a third content item associated with a concept different from a concept associated with the second content item, if the user score has reached a threshold.

In some examples, the recommender is further configured to determine the second content item from a plurality of candidate content items, wherein the second content item is associated with a maximum probability of success among the candidate content items, and wherein the probability of success associated with a respective content item represents a probability that the user will respond to the respective content item correctly.

In an aspect of the disclosure, a method of delivering educational content to a user comprises: receiving one or more user assessment variables based on a user's response to a first content item of a content database, the content database comprising a plurality of content items; recommending a second content item based on the one or more user assessment variables; and displaying the second content item on a display.

In some examples, the method also includes accessing the content database to generate a knowledge base based on the content database, wherein the knowledge base comprises a plurality of nodes and edges.

In some examples, the method further includes: accessing the plurality of content items from the content database; forming a corpus based on the plurality of content items; generating a probability model of the content items; and using the probability model to generate the knowledge base. In an example, generating the knowledge base includes: generating one or more nodes of the knowledge base, each node representing a topic; and generating edges amongst the nodes of the graph, each edge connecting a first node and a second node and including a weight representing a probability of the first node and the second node belonging to a same concept. In some examples, the probability model is a latent Dirichlet allocation (LDA) model.

In some examples, recommending the second content item comprises: accessing the knowledge base; generating a user model based on the one or more user assessment variables; using the user model to navigate the knowledge base to determine a node in the knowledge base; accessing content represented by the determined node; and recommending the second content item based on the content.

In some examples, the method also includes: determining a user score based on the user's response to at least the first content item and the second content item; and recommending a third content item associated with a concept different from a concept associated with the second content item, if the user score has reached a threshold.

In some examples, recommending the second content item further comprises: determining the second content item from a plurality of candidate content items, wherein the second content item is associated with a maximum probability of success among the candidate content items, and wherein the probability of success associated with a respective content item represents a probability that the user will respond to the respective content item correctly.

In an aspect of the disclosure, a contextualizer in an educational system comprises: a processing device; and computer readable medium containing programming instructions. When executed, the programming instructions will cause the processing device to: access content items; form a corpus based on the content items; generate probability model of content items; and use the probability model to generate a knowledge base. In some examples, generating the knowledge base includes: generating a plurality of nodes each representing a topic; and generating edges amongst the plurality of nodes, each edge connecting a first node and a second node and including a weight representing a probability of the first node and the second node belonging to a same concept.

In an aspect of the disclosure, a recommender system comprises: a processing device; and computer readable medium containing programming instructions. When executed, the programming instructions will cause the processing device to: access a knowledge base; obtain one or more user assessment variables; generate a user model based on the user assessment variables; use the user model to navigate the knowledge base to determine a node in the knowledge base; access content represented by the determined node; and recommend the content.

In an aspect of the disclosure, a knowledge exchange system includes: a first cluster of nodes representing one or more first topics and a first subset of edges connecting respective first and second nodes in the first cluster of nodes, wherein each of the first subset of edges includes a respective weight representing a probability of the respective first and second nodes belonging to a first concept. The system also includes a second cluster of nodes representing one or more second topics and a second subset of edges connecting respective third and fourth nodes in the second cluster of nodes, wherein each of the second subset of edges includes a respective weight representing a probability of the respective third and fourth nodes belonging to a second concept. The system further includes at least an additional edge connecting between a node in the first cluster of nodes and a node in the second cluster of nodes, wherein the additional edge representing an access between the first cluster of nodes and the second cluster of nodes.

In as aspect of the disclosure, a video delivery system includes: a processing device; and computer readable medium containing programming instructions. When executed, the programming instructions will cause the processing device to: access a video segment of a video; generate probability model based on the video segment; use the probability model to determine one or more concepts; map the one or more concepts to a time interval of the video segment; receive and store annotations of the video segment from one or more users; display the video segment to a user; and display the stored annotations of the video segment from the one or more users while the video segment is being played to the user.

In an aspect of the disclosure, a video system comprises: a processing device, and computer readable medium containing programming instructions. When executed, the programming instructions will cause the processing device to: access multiple video segments of a video. For each of the multiple video segments, the programming instructions will cause the processing device to: generate a probability model based on the video segment; use the probability model to determine one or more concepts; map the one or more concepts to a time interval of the video segment; receive a concept from a user interface; determine a video segment that contains the received concept from the user interface; and display the video segment.

BRIEF DESCRIPTION OF THE DRAWINGS

FIGS. 4A-4C illustrate example graphical user interfaces in a learning and recommendation management system according to various aspects of the present disclosure.

DETAILED DESCRIPTION

Figure 1:
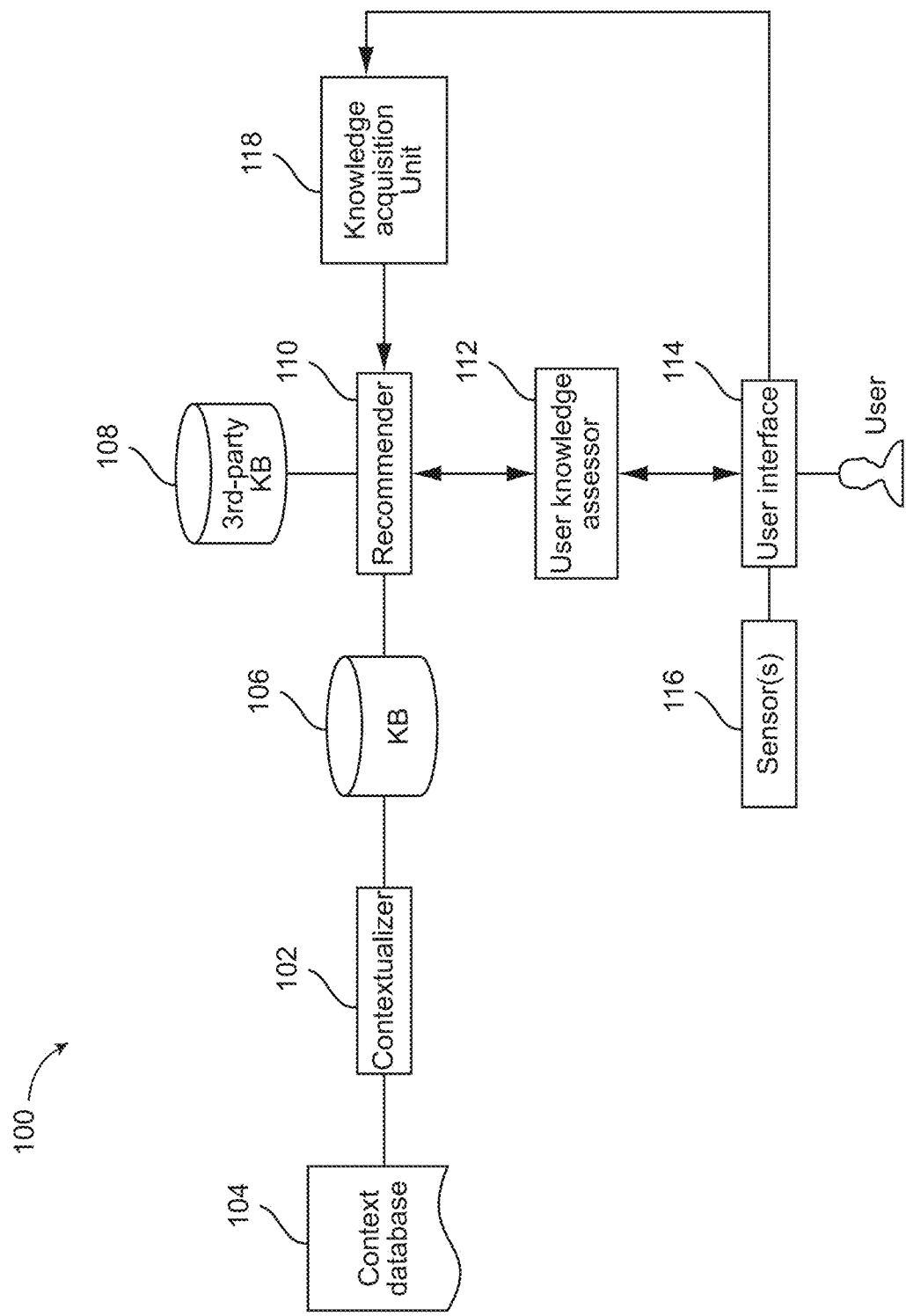
FIG. 1 illustrates a block diagram of an example learning and recommendation management system according to various aspects of the present disclosure.

Various embodiments of the present disclosure will be explained below in detail with reference to the accompanying drawings. The following detailed description refers to the accompanying drawings that show, by way of illustration, specific aspects and embodiments in which the present invention may be practiced. Other embodiments may be utilized, and structure, logical and electrical changes may be made without departing from the scope of the present invention. The various embodiments disclosed herein are not necessary mutually exclusive, as some disclosed embodiments can be combined with one or more other disclosed embodiments to form new embodiments.

The present disclosure includes a system that analyzes a library of content to generate a relational, graphical, or other type of linking connection database or other data structures of various content items, e.g., videos, presentations, slides, papers, quizzes, virtual reality media, augmented reality media, learning tools, lectures, and the like. In some examples, the content items may include educational materials. The relational database analyzes content, such as via natural language processing, image detection, and the like, to determine relationships and probability of words or other characteristics of various items of content, and using the determined relationships and probability assessments to generate a topic list. The topic list generated refers to the various topics covered by the content library. Further, once the topic listing has been generated, the system analyzes the content library again to determine topic probabilities for each item of content. The system then stores each content item as a node in a high-dimensional space within the database and includes weighted edge links defining relationships and the determined probabilities for the various topics of the content library. The topic probabilities help to define the specificity of a particular content item to a particular topic. Examples of specificity of a particular content item to a particular topic may include the extent in which the content item is likely to have cursory information of a topic or more in-depth/specific information for the topic. For example, a specificity represented by a high probability value of a content item to a given topic may determine that the content item is likely to have cursory information of the given topic.

Using the relational or content linked database, the learning or educational system may then recommend and present educational content items to a user. Once a user has engaged with a select item of content, the system can then recommend additional items based not only on the user's responses, but the various engagement characteristics, such as response time, latency, confidence level, enjoyment or usefulness ratings, order of actions (e.g., which answer options was selected first amongst a series of potential options), and so on. In this manner, the system can be configured to refine the content delivered to the user to hone in on the user's knowledge, aptitude or competency level and/or improve selected topics for the user. The educational system may also include a user knowledge and skill assessor to generate a user model as the user is expanding his or her knowledge and skills. In recommending new content or assessments, a recommender may use the learned user model to select a node closest to an ideal node in the knowledge base, and present the new content represented by the selected node. This process may be repeated indefinitely or until the user can demonstrate the necessary knowledge, skill set, competency or compliance. In some examples, the system may aggregate the relevant data from multiple users to improve or fine tune the accuracy of the recommendation.

In some examples, the user model may include information about the user's knowledge and certainty around selected concepts. In some examples, the system may acquire an expert's knowledge about certain concepts to refine the user model, increasing the accuracy of the recommender. In some examples, the system may be configured to train and build a subset of the knowledge base and make the subset of the knowledge base accessible to other organizations. In some examples, the system may use a latent Dirichlet allocation (LDA) model to generate or train a probability model of the content items and use that probability model to build the knowledge base. In some examples, the system may use a graph, such as a factor graph, to represent the knowledge base and use a suitable graph search method, such as K-D tree, to propagate the knowledge base.

In some examples, the system may recommend new content items by maximizing the user's probability of success around certain concepts that the user shows high proficiency, or improve the user's proficiency around the concepts the user shows weakness.

Turning now to the figures, a system of the present disclosure will be discussed in more detail. FIG. 1 illustrates a block diagram of an example learning and recommendation management system according to various aspects of the present disclosure. A learning and recommendation management system 100 may include a contextualizer 102 configured to access content database 104 and generate a knowledge base 106. In some examples, the content database 104 may include learning or informational content items and/or materials. Examples of learning content include videos, slides, papers, presentations, images, questions, answers. Additional examples of learning content may include product descriptions, sound clips, 3D models (e.g., DNA, CAD models). For example, the learning content may include testing lab procedures, data presented in an augmented reality (AR), virtual reality (VR), and/or mixed reality (MR) environment. In non-limiting examples, additional content that may be presented in an VR/AR/MR environment may include three-dimensional (3D) models overlaid in an AR environment, links of information related to product datasheets (e.g., marketing piece, product services offered by the company etc.), a script that underlies the video, voice or text that may be overlaid in an AR environment. As should be appreciated, the content can include various types of media, such as an existing video, audio or text file, or a live stream captured from audio/video sensors or other suitable sensors. The type and format of the content items may be varied as desired and as such the discussion of any particular type of content is meant as illustrative only.

The educational content items may include a wide range of information encompassing various subjects and/or topics. In some examples, the knowledge base 106 of the system including the content items, may include a graph or other type of relational or linking structure that includes multiple nodes, the nodes representing a topic in the knowledge. A cluster of nodes may represent a concept in the knowledge base 106. The graph may also include multiple edges between nodes, where the edges includes weights representing probabilities of two corresponding topics (nodes) belonging to the same concept or even related concepts. In some examples, a learning space may be defined by the knowledge base. In other words, knowledge base, knowledge, a learning space, or a particular space may be interchangeable.

With further reference to FIG. 1, the contextualizer 102 may be configured to use the learning materials to train a model that includes a set of topics and probability distributions for those topics, along with probability distributions for words from the corpus. In some examples, the trained model may be a LDA model. The contextualizer 102 may further use the LDA model to infer probability distributions for each of the content items to be related to the topics in the model. These distributions are used to position these content items in the space.

In some examples, the system 100 may further include a recommender 110 that accesses the knowledge base 106 and recommends content items to the user. Alternatively, and/or additionally, the system 100 may include a user knowledge assessor 112 that assesses and learns the user's knowledge with respect to a given topic or knowledge area. In other words, the recommender may recommend content based solely on topic or may recommend content based on topic, knowledge, and user's proficiency, as well as other factors. For example, the user knowledge assessor 112 may be coupled to a user interface 114 to present recommended content to the user and receive user data as the user engages the content that can provide feedback and inputs to the system regarding the user's knowledge of the topic. In some examples, the system may be a testing system and display questions for users to answer, while receiving various user assessment variables. For examples, the user assessment variables may include the user's veracity, the user's response time and/or confidence in answering each question etc. An example of veracity may include the probability of accuracy that the user will select all the correct answer options. Additionally or alternatively, the system may detect user characteristics in engagement with other types of content (e.g., non-question based), such as eye contact, eye tracking, facial expressions, note taking, head motion, voice, or the like, that can be used to correlate a user's understanding of a topic being presented via the content.

The user knowledge assessor 112 analyzes the user assessment or feedback variables to generate a user model representative of the user's level of proficiency or ability with respect to the presented topic. The user knowledge assessor 112 may use the user assessment variables to predict a user's ability around a concept (e.g., predict whether a user will be likely to understand selected topics). A user model, e.g., a student model, is a model of the state of a student, of all the states of the variables used to track a student's learning, where the variables are associated with user's behaviour responding to content items (e.g., questions). Examples of variables to model a student's learning may include: current confidence, veracity, specificity for each concept of the learning space, attention level, response time, and/or a combination thereof. A user model may also include the variables corresponding predicted states. Each variable of the model is represented by a variable node in a factor graph and the conditional dependencies between variables are represented by factor nodes. The whole factor graph represents the joint probability mass function of the variable associated with the user.

In some examples, the recommender 110 may generate recommended content based on the user's level of proficiency in the knowledge (or ability around a concept). When a student enters a learning space (such as the knowledge base contextualized as described above) a factor graph is created for the student. With each response to a content item in the learning materials, the graph is updated (e.g., by Bayesian rule), followed by obtaining the argmax configuration of the graph by running the max-sum algorithm on the graph, where the argmax configuration of variables maximizes the joint distribution represented by the graph. A factor graph is a factor, a representation, a factorization of the joint probability distribution over a set of variables, and functions representing the conditional dependencies between those variables. In an example factor graph, concepts may be represented by respective nodes in the graph, which may propagate from a current node to the next node.

In some examples, the recommender 110 may convert the argmax configuration into a point in the learning space, which represents the ideal point which the student would be expected to be at next. The ideal point would maximize the user's probability of success (in answering a question or learning from a video) in the next learning step. The recommender may select the nearest node in the space to the idea point is as the next node to visit and the process repeats. For example, the recommender 110 may generate recommendations for content that should be displayed or otherwise presented to the user that will help to maximize user's probability of success with engagement of the recommended content based on how strong or proficient the user is at the current knowledge.

In some examples, the system 100 may include one or more sensors 116 or other input/output devices coupled to the user interface 114. For example, the sensors 116 can capture, detect, or receive, one or more user assessment variables, e.g., a keyboard, a touch screen, a stylus, camera, or a microphone, may receive user input, such as user's answers to questions. The type of input/output device or sensor may vary as desired. Based the answers or other detected characteristics (e.g., input time, hesitation, eye movement, facial expressions, pauses in speech, or the like), the system can determine a veracity value related to whether the user believes the answer is correct, whether the user enjoys the presented learning content, as well as other feedback information related to the user's engagement with the content. A touch screen may display a confidence slider, or a selection of confidence sliders, for a user to select each time the user answers a question, where the touch screen detects the user's gesture and determine a position in the slider to calculate a confidence value. The sensors may also include touchpad sensor, pressure sensor. The sensor may also include wearable sensors, such as sensors that may be installed on a user's fingers (with or without gloves) to assess the way the user interacts with the user interface. Other sensors may include system timer to measure user's latency in answering questions.

In some examples, the system 100 may include a knowledge acquisition unit 118 that acquires user knowledge characteristics (e.g., feedback information), either directly or indirectly from the user, as well as external or non-user based information to refine the recommender 110. For example, the knowledge acquisition unit 118 may acquire external or non-user based information, such as an expert's (a person or a source of information that the system knows has proper knowledge around one or more concepts) knowledge, that can be used to refine the user model in the recommender 110. In an example, the system may utilize the topic assessment variables from the expert to predict the specificities of nodes about a concept, which can enhance the analysis of the user's proficiency of those topics based on the predicted specificities of nodes about the concept. For example, a node in a graph may represent a video. When an expert says that the video is strongly related to a topic (e.g., the expert says that a video related to a topic meets quality standards or other metrics), and the user engages the video in such a way that the feedback information appears to indicate that the user understood the concepts presented (e.g., the user also says that the video is good or otherwise is a quality or conveys information well) the system may increase the probability of the user to have a strong knowledge related to the presented concepts.

In some examples, the recommender 110 may also access a knowledge base 108, such as a third-party knowledge base or a third-party system. The third-party system may access the trained knowledge base 106. As content (e.g., knowledge base 106, 108) can be stored or arranged in a weighted graph with the weighted edges within the graph, accessibility or permission to access a selected subset of the graph (e.g., a cluster of nodes) can be represented by stored edges between nodes. In other words, the system can link together content across multiple databases and set perimeters based on the weighted edges, where the perimeters may define accessibility to a particular set or cluster of nodes (e.g., define whether a particular user can engage with a selected item of content). This arrangement allows users or database owners (e.g., companies owning a content library) to provide access to others (e.g., users or other companies) across the database. This type of knowledge base sharing in a graph structure among different systems allows certain nodes to be accessible to one or more systems (of one or more organizations) that need content in a particular area (or around one or more concepts). For example, in one instance, the knowledge base 106 is trained from system A, which has access to various learning content (104) on the area of genomics, whereas the knowledge base 108 is trained from system B, which has access to various learning content (104) on the area of information security. The nodes of the knowledge bases 106, 108 may be stored in the same graph structure, facilitating permissive sharing/exchange of the knowledge base between systems A and B via accessing the corresponding nodes in the graph structure. As such, access control and security associated with each node and each knowledge base among various systems may be properly managed. Alternatively, the systems or knowledge bases may be separate between different owners or organizations and the exchange between content libraries may be allowed within a defined access relationship, such as libraries for different divisions of an organization, rather than between organizations. In some examples, the system may facilitate knowledge exchange between organizations through a central knowledge bank. For example, the system may identify and predict gaps in content between organizations and then suggest content from the central knowledge bank, which could be accessible to the organizations which need it. In some examples, the system may wait for the organization receiving the exchanged knowledge to pay or verify before the system may authorize the organization into the knowledge space.

Figure 2:
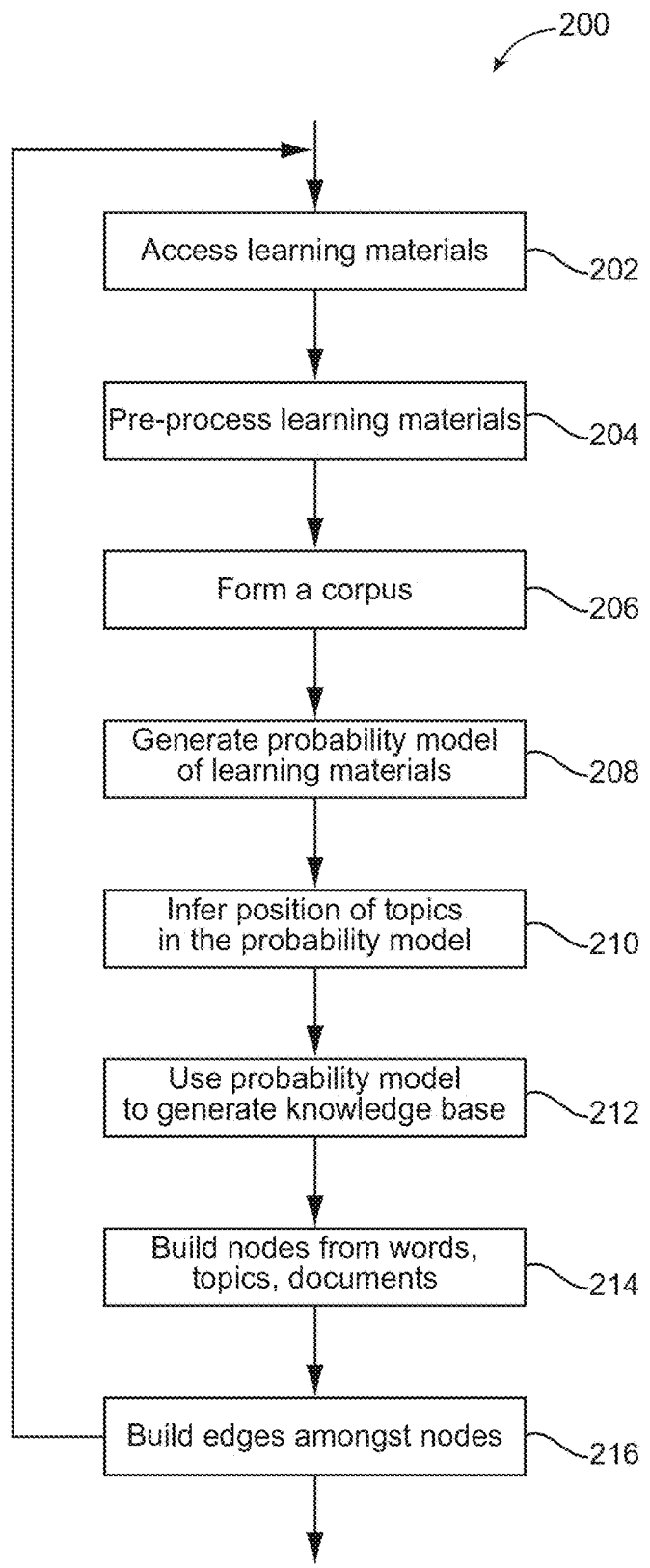
FIG. 2 illustrates an example process of generating a knowledge base according to various aspects of the present disclosure.

FIG. 2 illustrates an example process of generating a knowledge base according to various aspects of the present disclosure. In some examples, a process 200 for generating a knowledge base may be executed by a processing device. For example, the process 200 may be implemented in the contextualizer 102 (FIG. 1). The process 200 may include accessing content items at 202, where the content items may include various types of media, content, such as videos/audio/text, slides, questions, papers, presentations, answers, etc. In some examples, the process 200 may include pre-processing of the content items at 204, the preprocessing or formatting is done to allow the content items to be analyzed by the system. The type of preprocessing for extraction required may depend on the type of content analysis done by the system.

For example, the process 200 may retrieve or extract text data from all materials, such as questions, answers, text in the slides or video e.g., meta-data in non-text materials. In some examples, the system may convert non-text materials to text materials. For example, the system may extract data from the media in the form of audio transcripts, parsable text, and video/image analysis. In a non-limiting example, the system may perform optical character recognition (OCR) on scanned images of documents, perform transcription on video materials to generate video transcripts, or perform video analysis to generate text that represent the content of the video. The system may transcode the files to various formats to support mobile devices, desktop devices, 3D, AutoCAD, Augmented Reality, and Virtual Reality. The system may obfuscate the files from the transcoding process to help mitigate unauthorized access to the content items. For example, the system may rename the original file names to UUIDs. The system may strip metadata from a file, such as EXIF data from a photo, and store the stripped metadata in a protected repository, while pushing the obfuscated files to storage. The system may use technologies known or later developed for converting non-text to text materials. The preprocessing done may depend on the type of content items, as well as the learning methods applied to the content. For example, in some instances, the content may include images or videos, and image extraction and identification techniques or algorithms can be included or applied instead of the textual preprocessing done.

In some examples, the process 200 may further include forming a corpus at 206 from the pre-processed text. For example, the processor analyzes the processed content to determine a grouping of meaningful words that appears within the content, which may be done by language processing, image detection, or the like. The corpus may include a collection of words extracted or defined from the content. For example, the process may use natural language processing to remove extraneous characters, e.g., white space, irrelevant characters, and/or stem words extracted from the content and the remaining words may form the corpus. In some examples, the process may also remove selected non-meaningful, connecting, conjunction, preposition, and other words that may not define a topic, such as "to," "at," "from," "on," etc. The types of words may be based on grammatical rules for the language being evaluated and/or a list or table of words that can be generated by an owner or administrative. In addition to generating the corpus by extracting certain words, the corpus may also be generated by an expert or other user that implements words to be used in the corpus. In some instances, the system may utilize both the extraction of meaningful words for the corpus from the analysis of the content, as well as user added words.

In a non-limiting example, the process may include one or more of the following: removing newlines, cleaning text, stemming and/or lemmatizing words to generate tokens, removing common stop words clean-tokens, and/or cleaning tokens. For example, removing newlines include removing newline characters from text. Cleaning text may include converting text to lower case, removing brackets, removing numbers, removing number-character-number sequence, removing short words from text, and/or a combination thereof. Cleaning tokens may include converting tokens to lower case, removing non-alphanumeric characters and numbers outside words, removing short words (e.g., words having three characters or fewer), and/or a combination thereof.

Once the corpus is formed, the corpus may define topics or other learning areas for the content. In other words, the extracted words from the content items are used to determine the various topics covered by the content items. In other words, the corpus defines the information "buckets" or groups that are included within the content items.

The process 200 may further include generating a probability model of the content items at 208 based on the corpus. The probability model may include statistical predictions or relationships among the words in the corpus. In one embodiment, the probability model generates connections between the words in the corpus and determines likelihood of a word in the corpus being found next to or otherwise in the same content item as another word in the corpus.

The probability assessment may be based on the words analyzed for determining the corpus and the non-meaningful or other discarded/non-analyzed words may be omitted. In some examples, a language model (e.g., English, German) may be used to remove the non-meaningful or white space from the meaningful words. For example, in a corpus formed from content on genetic engineering, each of the words "guide RNA design" may appear with a lower probability in the corpus when compared with short words like "in," "of," "a," "and," etc., however, when each of the words "guide RNA design" does appear, it has some meaningful connection to the words around it. The probability model may include those connection relationships among the words in the corpus. In some examples, the probability model infers the positioning all the documents or the items in the corpus in a topic, in the topic space.

A topic space may be represented by a space graph—stored as nodes and weighted edges in a database. Weighted edges can be numbers or probability distributions. A space may include multiple nodes, and one or more topics represented in the nodes can be as narrow or broad as desired, depending on the number of nodes in the space. Using the probability assessment, the process can then define relationships between the various items in the corpus and define how a particular item is likely to relate to a particular topic or topic space. For example, a content item, such as a video, is represented as a node in the topic space. The content item may have edges that relate to multiple topics (as words relating to those topics are present in the video). Among the multiple topics, the content item may have a higher percentage of words related to a first topic, and therefore may have a high probability edge with respect to the first topic and lower weighted edges with respect to the other topics. In a non-limiting example, the system may correspond a content item to three topics to be presented to a user. Other number of topics may also be possible.

In a topic space, content items that may correspond to a topic (e.g., those predicted to have a high probability of including information related to that topic) may be arranged or otherwise linked. A space may include one or more nodes by reference (e.g., using linked object) helping to prevent duplication of materials. In other words, content represented by a node may have only one instant whereas other applications may refer to the node without duplicating the content of the node. This facilitates reduced communication to the server and generates a significantly smaller memory footprint than other types of structures. In other words, the data or content referenced is able to be delivered to the user as needed, a single time, whereas the relationships linking the data can be updated over time.

Examples of a space may include collections of nodes representing content items. A space may refer to a particular level of content, such as topic space and word space. A word space may include words that appear together. In some examples, the process may use a bag of words model, and derive the probabilities of each word by its chance of appearing with another word. A topic space may include topics that are related. In generating the probability model, the process 200 may train a LDA model from the corpus. The LDA model may result in a set of topics. An example of a topic may include a combination of words that have a high probability for forming the context in which other phrases in the corpus might appear. For instance, in training a corpus about 'CRISPR' (specialized stretches of DNA in bacteria and archaea), the LDA model may include "guide RNA design" as a topic because it includes a high probability combination of words that other words appear in the context of CRISPR. In some examples, a topic may be an approximation of a concept. Words that are found within close proximity with one another in the corpus are likely to have some statistical relationship, or meanings as perceived by a human.

In some examples, the process 200 may use the trained LDA model (or other probability model) for inference. For example, the system may feed all text forming the corpus to the trained model, and infer the positions of topics in the LDA model at 210. The positions may indicate the probabilities for the topics from the model. For example, for a question (e.g., a segment from paragraphs, phrases of video transcripts), the system may infer the topics as to what the question is likely about from the model, and determine the probability distribution of topics for each text in the learning space that comprises the content items.

In some examples, the LDA model learns the relationships between the word space, the topic space and document within the topic space, and infer the positioning of documents within the topic space. The trained probability model (e.g., LDA) may be a generative model, meaning that it is as though the corpus had been generated by that model. In some examples, a trained model may include a set of topics that are parameters to the model (e.g., five topics) and associated probabilities for any document to be related to that topic.

In some examples, the process 200 may use the LDA model for inference by feeding texts or other information forming the corpus back into the model and inferring positions. The positions may represent the probabilities for the topics from that model. In other words, the system may take a new document and used the trained LDA model to infer the probability for the new document to be related to the topics in the topic space. In some examples, the inference result may include probability distribution of every content item (e.g., text, video or other types of content) over topics. For example, the process 200 may infer a position of a video, as a whole.

In a non-limiting example, in a given domain, such as in trigonometry in mathematics, the probability of words over concepts of triangles, angles and distances may be slightly higher than those over other topics. In another non-limiting example, in a CRISPR space, the corpus may include a topic guide RNA design targeting in mutagenesis. A particular video might focus more on the effects of guide RNA design on mutagenesis. The probabilities of these words over the two topics may be slightly higher than those over other topics. In some examples, the probabilities as result of the LDA model may be conditional probabilities that represent how often a word may appear in a given context, for example, the conditional probability of the word "guide" in the CRISPR space.

In some instances when content items contain shorter words, the process 200 may use multiple words surrounding the shorter words when analyzing the content items. For example, a sliding window of inferences can be applied around words as they are analyzed for context. In these instances, the process 200 may not only infer context as a whole, but also infer context on a single word based on the words that came before it and the words that come after it. The process may continuously update the context (concepts) as a sliding window moves. For example, as the process is analyzing a word, the process also analyzes seven words surrounding that word to infer context to the word being analyzed. This allows the system to predict concepts that are increase/decreasing in probability as the LDA proceeds through the content, allowing future windows to be weighted differently than the present windows.

In some examples, the sliding window may include words that are directly surrounding the center word (e.g., the words that surround the center word in the content items. In some examples, the sliding window may include words that are surrounding the center word after non-meaningful words are removed (e.g., removing new lines, stop words etc. as described in the present disclosure). As described in the present disclosure, the process may use conditional probabilities to analyze the centered word. In some examples, the size of the sliding window may change as needed. For example, the window size may be higher than seven.

Figure 3A:
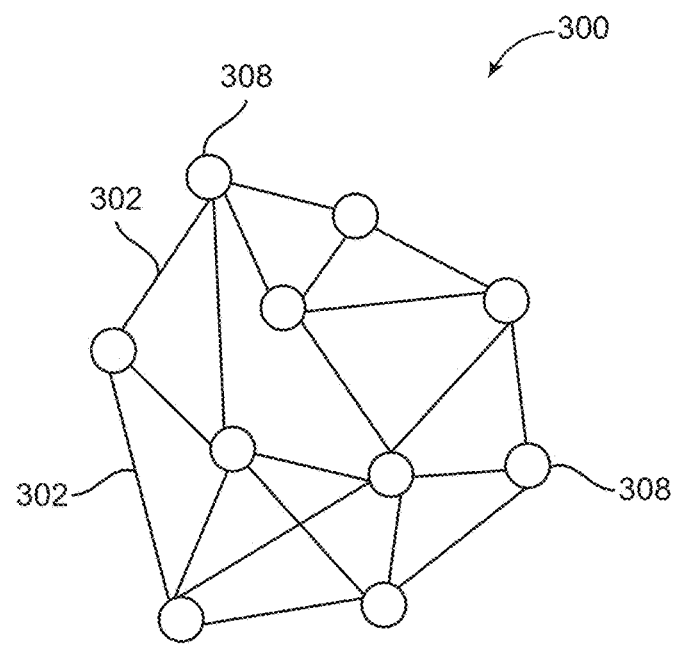
FIG. 3A illustrates an example data structure of the knowledge base according to various aspects of the present disclosure.

In some examples, the process 200 may use the LDA model (or other probability model utilized) to generate a knowledge base at 212, which is further described with reference to FIG. 3A. FIG. 3A illustrates an example data structure of the knowledge base according to various aspects of the present disclosure. In some examples, a knowledge base 300 (which may be implemented in 106, 108 in FIG. 1) may include multiple nodes 308 and multiple edges 302 connecting the nodes. In some embodiments, a graph is used to illustrate the relationships between content items and concepts but other relational structures can be used to map the connections. In FIG. 3A, the graph may represent the transitive dependencies between nodes, allowing nodes to be linked to concepts the node is about and facilitate traverse of the graph with a query to find such nodes.

In some examples, the edges 302 between the nodes 308 can be weighted to represent the strength of the relationship between the object (e.g., content item) and topic. In some examples, an edge between two nodes may have a weight on each end of the edge, where the weight represents the strength of the relationship between the object to which the edge is attached, such as a video, and the context (concept) the node is about. As the result of learning LDA model and knowledge base building, the knowledge base, such as 106, 108 (FIG. 1) may include a graph database comprising nodes and weighted edges between nodes, such as shown in FIG. 3A. The weights of the edges are stored as numerical values or probability distribution.

In some examples, some text may be combined and represented by a parent node, and the probabilities may be obtained for a parent node. For example, short text, e.g., a question or an answer in combination, short answer, or very short text-like answers, may be combined with their parent objects such as their parent questions. The probability distribution may be generated over the parent objects. Other examples of a parent object may include video transcripts, segments, paragraphs or phrases from video transcripts. In a non-limiting example, a short text of a slide, of which the accuracy would be impaired, may be supplemented by the video transcript about the slide.

Returning to FIG. 2, in generating the knowledge base, the process 200 as executed on the system or processor, builds the knowledge base graph from the LDA model by generating nodes in the graph at 214 from content items in the content library and topics from the LDA model. The process 200 may also build edges among and between nodes at 216 based on conditional probabilities of the topics in the probability model, such as LDA. As the content items can be changed, e.g., added or deleted, the system trains the LDA model and accordingly adjusts the nodes and edges in the knowledge base. For example, optionally, as new nodes are defined in the knowledge graph database to represent the original media file (and its various transcoded formats), the process 200 may repeat by returning to box 202 and positioning the nodes in the knowledge graph.

In some examples, the contextualization may be performed or updated as new information or content items become available. This refers to a process of inferring the position of new content in the knowledge space using the concepts (e.g., nodes in a learning space) that were defined in the first contextualization. This is done without needing to re-contextualise the knowledge space. Rather, the additions can be assessed as a "delta" update to the current knowledge space and added to the space, rather than requiring a full re-contextualization of the space. The technical effect includes easy and fast addition of new content/data or the updating of existing content in the knowledge space without changing the foundational structure of the network. Because the concepts that define the knowledge space are unchanged the presentation of data analytics can be easily preserved, and data can now also be collected on the new/updated content.

In some examples, the knowledge base (e.g., 106, 108 in FIG. 1, 300 in FIG. 3A) may be utilized to implement a recommender (e.g., 110). FIG. 4A illustrates an example graphical user interface in a learning and recommendation management system according to various aspects of the present disclosure. In some examples, the graphical user interface (GUI) arrangement 402 may include a pixel array screen on which, in operation, one or more questions (e.g., interrogating subject matter) related to content modules of a node are provided to a user to obtain a response or otherwise detect feedback from the user. Optionally, the GUI 402 may include a slider 404 or other user engagement item for each of the questions to obtain a confidence metric of the user while responding to each of the questions. In some examples, a plurality of sliders, may be provided on the sensors (e.g., 116 in FIG. 1) for use by the user when answering the questions (interrogating subject matter), and the user is required in operation to respond by suitably positioning the sliders. Optionally, the user is interrogated by a same given question multiple times; each time the given question is repetitively shown to the user, in a different order for example. The slider arrangement can be in horizontal or vertical slider orientations, relative to an upright orientation of a user employing GUI 402.

In some examples, the system may be configured to display the multiple choice questions in a different order. For example, the system may permute the answer options each time a question is shown. This may effective avoid the user remembering the order of the answer options and then being able to work out which of them is incorrect or correct. This also has the benefit of removing bias in the position of correct answer options created by humans (i.e. some instructors statistically tend to make answer option B correct more frequently).

The confidence slider described in the present disclosure (e.g., 404 in FIG. 4A and 410E in FIG. 4B) increases the amount of data collected. The user needs to move the sliders to indicate the level of confidence they have in their chosen answer options being correct. When users are confident and correct, they are awarded points; when they are confident and incorrect, they lose points. The goal of the system is to allow the user to gain as many points as possible. The various algorithms and operations described in the present disclosure are not influenced by the score, but instead, integrate all of the data on confidence, correctness and optionally other factors like time, speed/velocity of movement, order of actions etc, to update the user's student model and determine which content the user should see or interact with next in order to increase the user's proficiency in the relevant concepts, e.g., concepts that define a program in which the user is engaged. A technical effect here is that the system will collect substantially more data that will allow the system to more accurately predict information from the user and in a more effective and efficient manner than conventional systems.

Figures 4B, 4C:
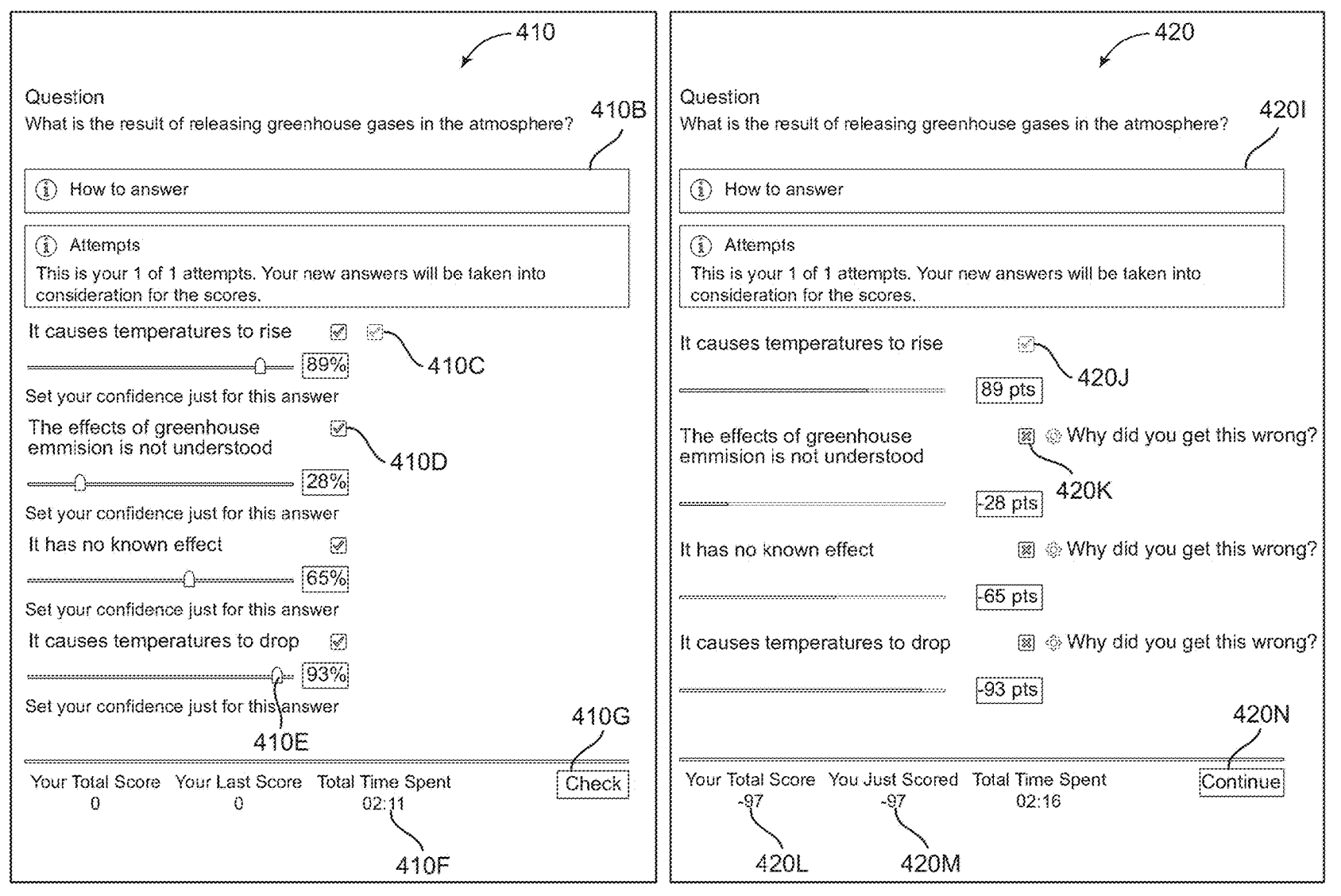

FIG. 4B illustrates another example graphical user interface in a learning and recommendation management system according to various aspects of the present disclosure. In a multiple choice assessment 410 in FIG. 4B, the system may display each of the multiple-choice answers with a slider to receive user's confidence value per answer option. This provides more data for the system to analyse user's performance. In some examples, the system may use a scoring system to incentivize proper use of the confidence sliders. For example, when the user is confident and the answer is correct, the user scores points. Conversely, when the user is confident but the answer is incorrect, the user loses points. In this way, users cannot simply guess without being penalized.

With further reference to FIG. 4B, the multiple choice assessment interface 410 may include an example question 410B presented to a user, an indication 410C of the correct answer which is only visible to administrators to assist in testing the system, a tick mark 410D which shows that the user has selected that answer as correct, and a confidence slider 410E. Each answer option is rated independently of the others out of a possible 100%, where 100% represents complete certainty. The user interface 410 may also include a measurement of time taken for the user to answer the question, 410F. The user clicks button 410G to submit the choice of answer options and confidence to the system.

FIG. 4C illustrates another example graphical user interface in a learning and recommendation management system according to various aspects of the present disclosure. A multiple choice assessment interface 420 may be viewed after user has submitted the answer choices and confidence measures to the system. The multiple choice assessment interface 420 may include information box 420I, which contains an explanation of how to use the confidence sliders to answer the multiple-choice question. The interface 420 may also include a tick mark 420J showing the correct answer options, a cross 420K showing the incorrect answer options. The interface 420 may also include user's total score 420L calculated from all questions answered. In the case shown in FIG. 4C, the user has only answered one question. The interface 420 may also include the user's score 420M for a specific question, and a button 420N. In some examples, the button 420N allows the user to continue to the next node determined by the model.

Figure 9A:
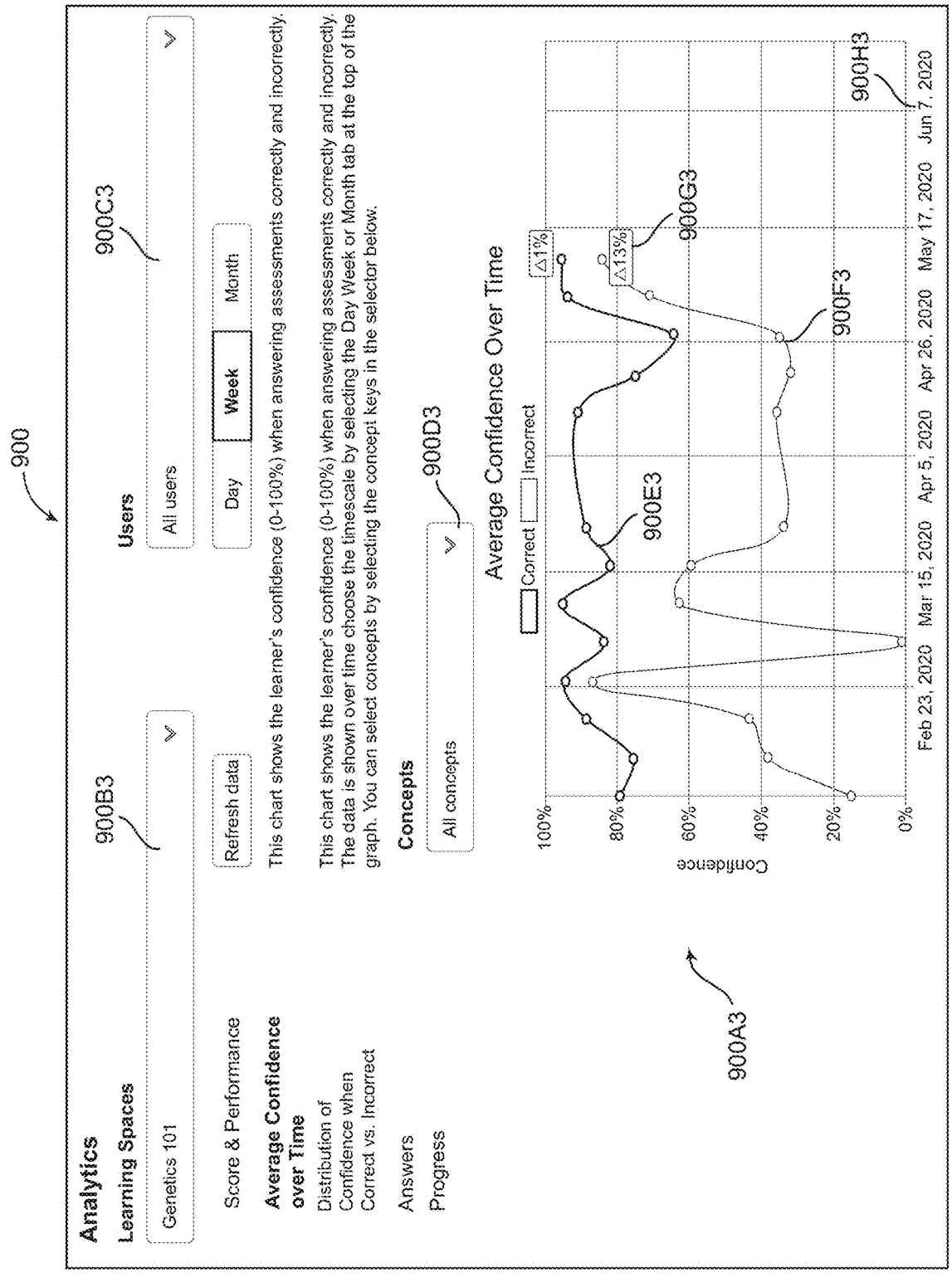
FIG. 9A shows an example plot of confidence level of correct and incorrect answers over the time with respect to the concepts according to some examples described in the present disclosure.
Figure 9B:
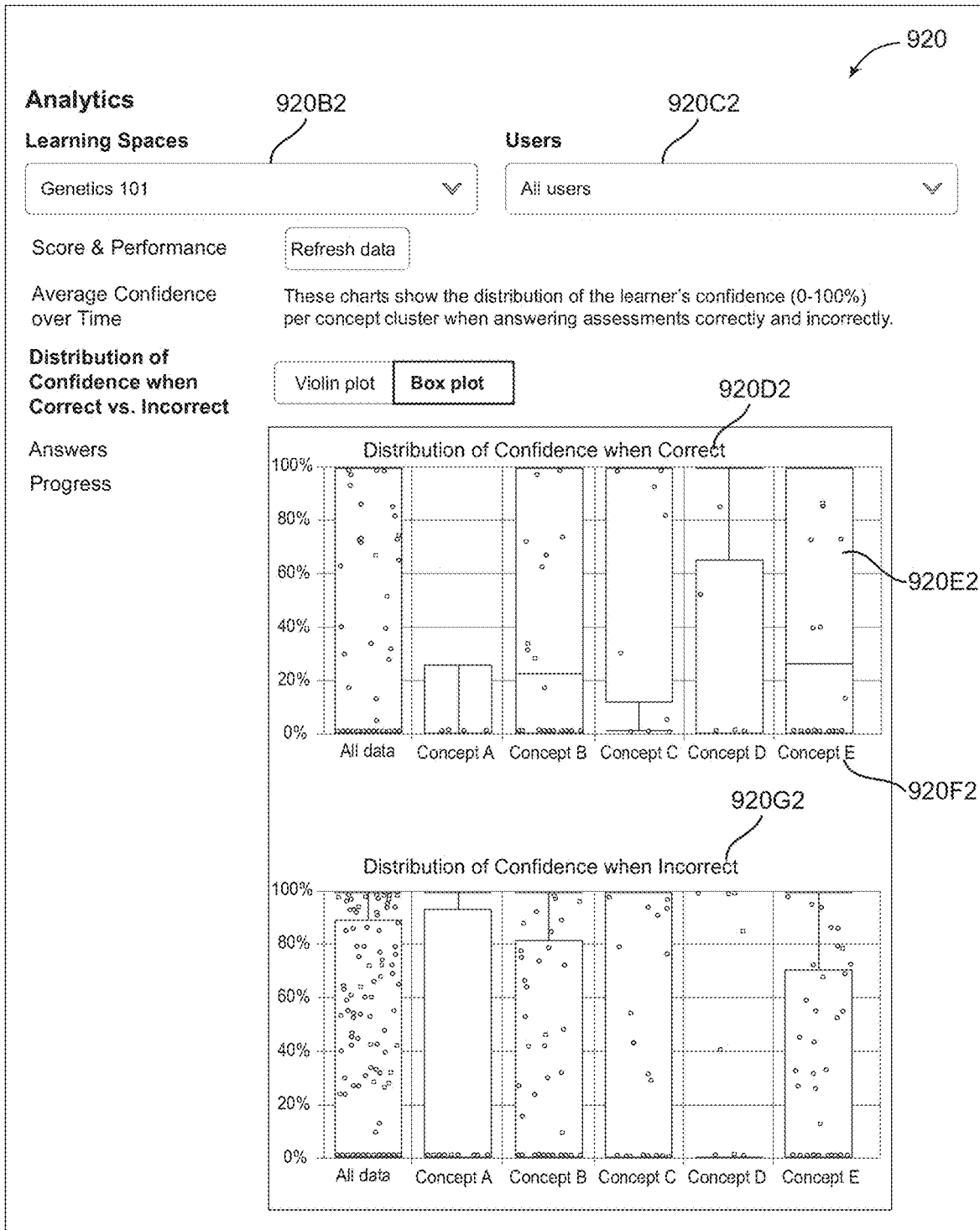
FIG. 9B shows an example plot of distribution of confidence per concept according to some examples described in the present disclosure.

FIGS. 9A-9B show some example results based on the user data collected in FIG. 4A, or FIG. 4B, for example. FIG. 9A shows an example of various widgets in an example user interface 920 of the system described in the present disclosure. For example, 900A3 illustrates an example analytics for user learning data; 900B3 illustrates selection of learning space to present data; 900C3 illustrates selection of individual user or user group to present data; and 900D3 illustrates choice of concept to present data. In some examples, in widget 900A3, a plot 900E3 illustrates data showing confidence over a time line 900H3 when users answer correctly. This chart shows an average for all users. A plot 900F3 illustrates data showing confidence over the time line 900H3 when users answer incorrectly. This chart shows an average for all users. In some examples, the system shows a percentage increase or decrease in confidence at 900G3 since the last time point on the time line. As shown in FIG. 9A, the scale of the time line 900H3 may be adapted to show data over days, weeks, or months etc.

FIG. 9B shows an example of various widgets in an example user interface 920 of the system described in the present disclosure. For example, widget 920A2 illustrates an example presentation of learning analytics data. Optionally, widget 920B2 may illustrate the data for different learning spaces. Optionally, widget 920C2 may allow a user to select how data are shown, for example, for individual users or combined user groups. Widget 920D2 may illustrate presentation of confidence statistics when users have answer questions correctly; and widget 920E2 may illustrate statistical data in a number of different graphical formats including 'box-and-whisker' plots or 'violin' plots etc. Widget 920F2 may show data independently for each topic or concept that make up a learning space. Widget 920G2 may show presentation of confidence statistics when users have answered questions incorrectly.

In some examples, a dynamic switching in operation between horizontal and vertical slider orientations is employed to enhance user engagement when challenged with the interrogating subject matter, and to try to avoid the user merely recording finger orientations with respect to the challenging subject matter. In some examples, the user interface may be configured to measure the user's speed in acting the sliders or the speed of user's mouse movements when the user is engaged with the graphical user interface. The system may further measure a trail of the user's mouse movements and/or clicks, store this to the user's student model, and then detect any anomalies with respect to deviations in a user's normal behaviour characteristics. For example, the system may detect that a user clicks the mouse frequently in an area of the graphical user interface where a specific question is being asked. By doing so, the system determines the user's confidence value regarding the specific question passively. The user interface may further be configured to detect the user's veracity. For example, for a question presented to the user, the user interface knows where in the screen a check box or boxes for the correct answer(s) should be. Upon detecting a user click, the user interface may determine whether the user has answered the questions correctly by comparing the location where the mouse was clicked and the expected position (or area) of the correct answer check box or boxes.

Figure 3B:
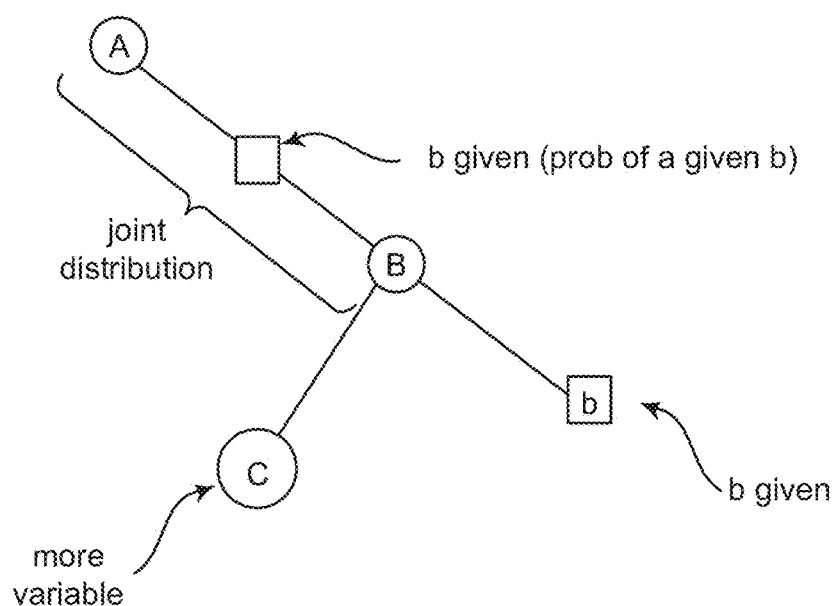
FIG. 3B illustrates an example data structure of the user model according to various aspects of the present disclosure.
Figure 5:
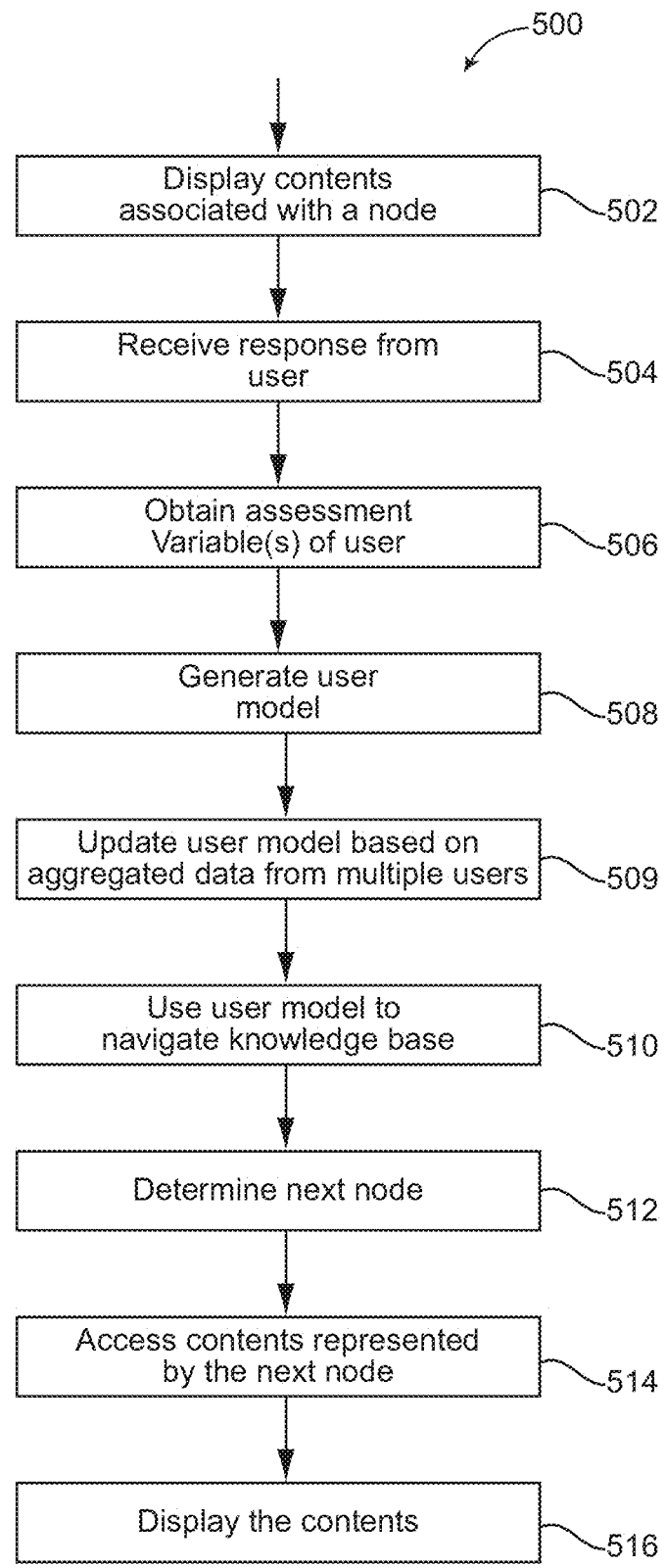
FIG. 5 illustrates an example process of assessing a testing user and recommending new content to the user according to various aspects of the present disclosure.

FIG. 5 illustrates an example process of analyzing testing users and recommending additional content to be displayed to or otherwise presented to the users with reference to FIG. 3B. In some examples, a process 500 may be implemented in the recommender 110 (FIG. 1) to recommend the next content to a user as the system learns the user's behavior. In some examples, the recommender 110 may include a user interface, such as 402 in FIG. 4A. In a non-limiting example, the process 500 may include building a student model by using one or more assessment variables of the user. For example, the process 500 may display certain content to the user at 502 via a user interface, where the content may include one or more questions (e.g., 402 in FIG. 4A) for the user to answer. The questions may represent a node in the knowledge base graph (e.g., 300 in FIG. 3A), e.g., the questions form a content item that is a node. The process 500 may further receive a response from the user at 504, such as via an input/output device or a sensor. Depending on the type of questions, the response may include "yes" or "no" or multiple choices, or a simple answer or rating system as to whether the user thinks the document (e.g., a video) is useful. In other words, the type of direct user input may vary depending on the content item, as well as the type of content being displayed (e.g., video versus quiz, etc.).

As the user answers questions or otherwise engages the content via the user interface of the system, the system obtains one or more assessment variables at 506 to generate a user model at 508. The assessment variables may include various information measures that facilitate assessment of users (e.g., students), i.e., other types of user feedback information. For example, the user's reported or detected confidence in answering the question, the veracity (e.g., whether a user got this particular questions right or wrong, or whether a user states that a piece of content, e.g., video, is useful to the user or not), and the confidence associated with user's perception on whether a content is useful. For example, the user may indicate 100% full confidence that he likes the video. Or, the user may indicate 70% degree of confidence (likelihood) that he or she enjoys the video. The assessment variables vary based on the type of nodes, e.g., a question or a video. For example, in instances where a node represents a question, the variable may be binary to indicate whether the answer is right or wrong. The confidence may be a non-binary value indicating the degree of confidence. The process 500 may obtain these assessment variable from the user via the user responding to presented materials, such as answering questions via the user interface (e.g., 402 in FIG. 4A), or may determine the variable indirectly, such as detecting one or more user engagement characteristics while the user is engaging with the content, e.g., answering the questions.

In some examples, the assessment variable may also include a specificity value for a concept. For example, for each concept space, a notion of specificity may be defined (e.g., via probabilities, expert input, or the like) for that concept, indicating a likelihood that the system expects a user to get an answer right. For example, the system may expect an expert in guide RNA design to be able to get questions right about that topic area/subject matter, which means that the specificity value for the concept of guide RNA design for the expert is high. Conversely, the system may expect a user who gets most questions in a topic area/subject matter to have a lower specificity value for the concept in the topic area.

In some examples, the process 500 may include generating a user model at 508 to determine how strong a user's knowledge is, or how proficient the user is at grasping certain concepts. In some examples, the process may start with baseline assumptions or prior probability distributions. For example, the system may assume uniform distribution about users' specificities, under which assumption each concept may have equal specificity, such as in a range of lowest value (e.g., zero) to highest value (e.g., ten). A specificity value may correspond to no knowledge or very high ability (proficiency) of the user. In other words, the system may not know whether the user is an expert or a beginner. In the process 500, the system may measure the assessment of a user and obtain assessment variables of the user, build the user's model and infer future variables of the user.

In generating the user model, in some examples, the system may use a Bayesian network via a belief propagation that will update the posterior distributions for predicted variable states given the past or prior probabilities of those variables. For example, a joint distribution in the user model may be factored out and broken down recursively using Bayesian rules. In a non-limiting example, a user is presented with a question initially about concepts A and B. The system may assume average specificity for concepts A and B. FIG. 3B illustrates an example data structure of the user model according to various aspects of the present disclosure. As shown in FIG. 3B, node B represents how well a user did before, node A represents how well a student might do. A joint distribution from node B to A represents the probability of a given b. When the user answers a question right, the system may predict the user's ability in successfully answering additional questions about the same concept. In the current example, the user's ability for concepts A and B for which the questions are related will increase, e.g., the posterior probabilities may increase.

Additionally, and/or alternatively, the process 500 may update the user model based on aggregated data from multiple users at 509. For example, a user model may be fine-tuned based on the user models of other users. In some examples, the process may analyze the aggregated data by way of probabilistic or deep learning. This may be implementing by defining probabilistic weighting on the user model and use a machine learning process to train the weights based on the aggregated data.

With further reference to FIG. 5, the process 500 may use the generated user model to recommend future educational content for the user. For example, the process 500 may use the user model to navigate the knowledge base at 510. The system may use the learned or generated posterior probabilities from the user model to determine a next node in the knowledge base at 512. In some examples, in determining the next node, the system may maximize the user's probability of correctly answering questions about those concepts. Once the system determines the next node, the process 500 may access the content represented by the next node at 514. For example, the content may include questions, video or other content items. The process 500 may display the accessed content of the next node to the user at 516.

In some examples, a subset of nodes in a learning or educational space, including content items from the library, may form a temporary space for a user or a group of users. For example, the system may form the subset of nodes based on the strength of the relationships between the subset of nodes in the space and the concepts to which the content items relate. The system may use the probabilities to form those weights to define the temporary space. For example, the system may query the nodes and edges (representing probabilities) in the knowledge base to build the temporary space. The temporary space may track node locations for a user or a group of users. In some examples, the system may use K-D tree to query the knowledge graph. A K-D tree search of the graph may look up nearest neighbors in the graph very fast in logarithmic time.

As user is learning, the system may track the assessment variables of the user and the specificity of each concept, and determine where the system believes the student has knowledge and predict the next questions/content for student to engage. In some examples, the process 500 may search for an ideal point in the temporary space for a user. The ideal point in the space is a point which might seem, for which the configuration of all the variables in the model is optimal. In some examples, the system may determine an ideal point in space that has the maximum posterior probability for all the variables. The system may use a K-D tree or other search methods to find the nearest node to the ideal point in space. In other words, the system may present the next content that maximizes the user's success in the concept represented by the node by assessing the user's performance from answering/reviewing the content.

In some examples, the system may also combine the K-D tree search with the user model. For example, by assessing the assessment variables of a user from answering questions, the system may use the assessment variables to update the specificity of the concept to which the questions are related. The system may determine the user's knowledge and predict the next question to be presented to the user based at least on the determination of the user's knowledge.

While the process 500 illustrates an example recommendation process for recommending new content to the user, variations may exist. For example, whereas the finding of the ideal point (or the next node nearest the ideal point) is based on maximizing the probability of success (to get the questions answers right) for the user, in some variations, the system may find the ideal point based on what to expect from a user. For example, the system may find the ideal point in the factor graph based on the concepts with low specificity.

In some examples, conditional distribution functions at the factor nodes of a student model can be designed, and/or learned from data. The system may gain more data and use learned functions, where a user's learning experience, represented by a joint probability function, may be obtained by a product of various learned functions along the learning process. The system may search the ideal point based on the conditional distribution functions including the factor graph. Other goals may be achieved by using different conditional distribution functions, whether to drive the user's strength by staying with the concepts that the user is strong or has an aptitude (with high specificity), or improve the user's knowledge and proficiency by focusing on the concepts that the user shows weakness (with low specificity). The various embodiments described in the present disclosure may be auditable and deterministic to facilitate verification of learning and factors which influence learning where necessary.

In some examples, in building the user model, the system may predict the specificities of certain concepts for the user based on the user assessment variables. For example, the system may base the prediction at least on the user's confidence in answering the questions. When the user answers questions in high confidence, the system may predict higher specificities than when user getting questions right with low confidence. In such case, the system may propagate the space faster, and the user may progress through the learning process faster.

In some examples, the system may assess the user's ability based on other assessment variables. For example, the system may track the user's latency in answering questions, e.g., how long it takes a user to respond to certain questions, and use that information in the factor graph. In some examples, the system may use a system clock to measure the time the user took to respond, quantize it and determine a discrete value, such as low, medium, or high (or short, long). The system may add additional nodes in the factor graph to represent the latency.

Other assessment variables e.g., the click speed and mouse movement speed across the screen, may also contribute to the factor graph. These variables may be obtained from various sensors, such as sensor(s) 116 in FIG. 1. Alternatively, and/or additionally, other suitable measures in metric space, e.g., Euclidian distances, may be used to find nearest neighbors in addition to K-D tree.

In some examples, the system may use an expert's knowledge to determine the specificity of certain concepts. For example, the system may use the factor graph to predict the specificities of nodes about certain concepts. A node in the factor graph may represent a piece of content, such as a video. When the expert says that the content is strong at conveying information for a topic or otherwise of a strong quality, the weights in the factor graph about a concept the content is about may change with higher specificity. Accordingly, when a student also provides positive feedback about the video, the probability of the student being proficient at the concept about the video also increases.

Figure 6:
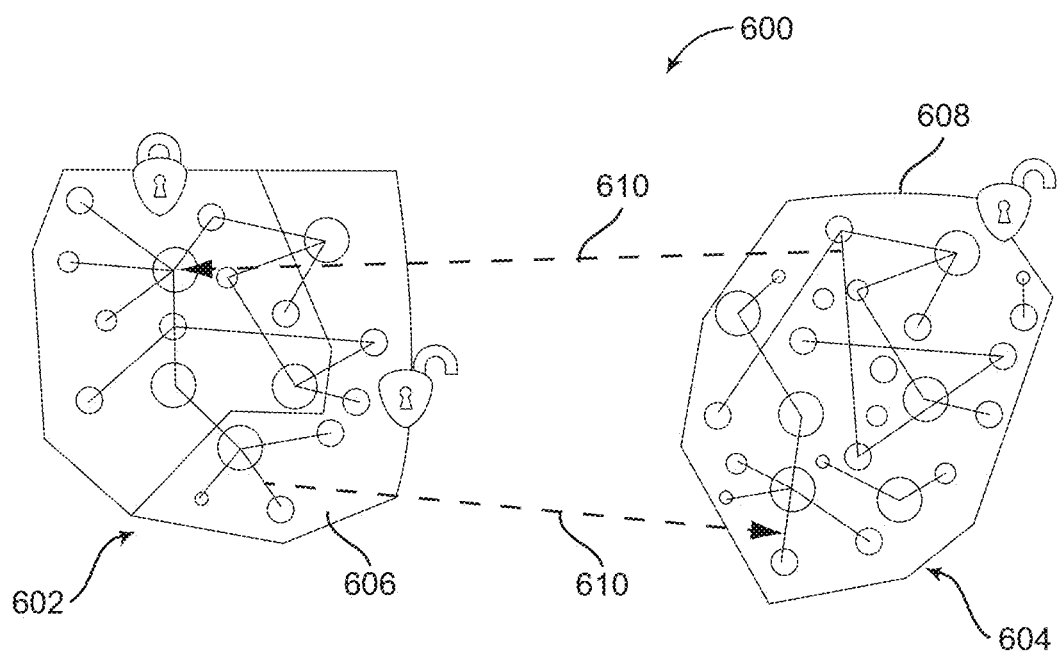
FIG. 6 illustrates an example of a multi-dimensional space built upon the user knowledge according to various aspects of the present disclosure.

FIG. 6 illustrates an example of a multi-dimensional space built upon the user knowledge according to various aspects of the present disclosure. In some examples, the system may be configured to train particular nodes of content between organizations, where not all organizations (for instituting tests to students, for example) have all the content available. For example, one organization may have experts to train particular nodes representing certain content and make the available nodes sharable to other organizations. The particular nodes may be used to contain certain concepts and may be trained using the various embodiments described above in FIGS. 1-5. As nodes themselves are owned by a particular business entity, they can be individually repurposed or shared (traded, leased, or sold) nodes owned by other business entities.

In some examples, in FIG. 6, when considering that all of the content in the knowledge base (e.g., 106, 108 in FIG. 1, 300 in FIG. 3A) are stored as one weighted graph, such as 600, the system may suggest content gaps in a particular organization's knowledge base. For example, an organization may train certain nodes 602 in certain space, and make them sharable to other nodes associated with other organizations, such as 604. Similarly, another organization may train certain nodes 604 and make them sharable or associated with one or more other nodes, such as 602. In some examples, sharing content of certain nodes with other organizations may be readily implemented with the graph structure. For example, the permission to access a subset of the graph is handled by security level of nodes. Additionally, and/or alternatively, the accessibility of between two nodes may be represented by stored edges between the two nodes, such as 610, where the edges between the nodes may represent an access (e.g., allow/deny) to the nodes (e.g., public or private) to which the edges are connected.

Figure 7:
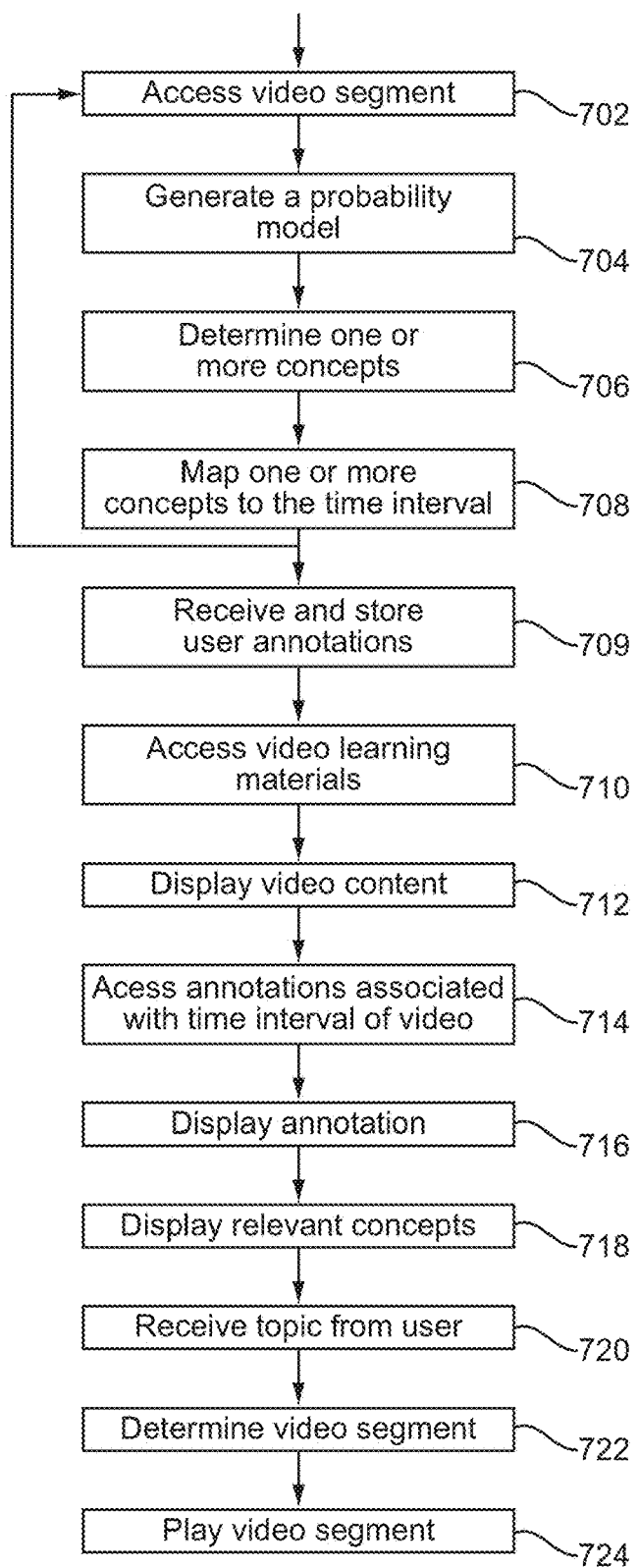
FIG. 7 illustrates an example process of retrieving video concepts and annotations according to various aspects of the present disclosure.

FIG. 7 shows an example process of retrieving video concepts and annotations in a learning system in accordance with various examples provided herein. In some examples, the system (e.g., 100 in FIG. 1) may store the video content items with additional data that stores the annotations for one or more time intervals of the video for later retrieval, where the annotation stores information about what the video in the respective time interval is about in terms of one or more concepts and the probabilities of this interval to be related to them.

In a non-limiting example, an example process 700 of video annotation retrieval in the system (e.g., 100 in FIG. 1) may include accessing a video segment (with a time interval) at 702. The process may further include generating a probability model from the video segment at 704, using the probability model to determine one or more concepts at 706, and mapping the one or more concepts to the time interval of the video segment at 708. In determining the one or more concepts, the process 700 may use a similar method as described in FIG. 2. For example, the process may use a windowed-LDA by learning an LDA model from the video transcript and any additional contextual texts from a window representing the time interval.

When a user is using the learning system, the system may receive annotations and feedback from the user. The system may also provide the annotations and feedback from other users to the user. For example, a user may comment that the user likes a video while watching the video. The process 700 may further receive and store the user's annotations of a respective video segment at 709 based on the mapping(s) between the concepts and time intervals. In some examples, during a learning or educational process, the process 700 may include accessing video content items at 710, displaying the content of the video content items to a user at 712, accessing annotation associated with a time interval of the video content items at 714, and displaying the annotation at 716. These operations may facilitate the retrieval of user annotations to give user an enhanced learning experience. For example, a user may be watching a video about a certain area of interest, e.g., CRISPR gene editing. While the video is being played at an instant of a time interval, the system may retrieve annotations from other users for the time interval and display the annotations concurrently. The annotations may include what other users have said or other feedback regarding what the video is "about" at this point in time.

Additionally, and/or alternatively, while the system is playing the video to the user, the process 700 may also display relevant concepts (topics) about the video at 718. For example, while the CRISPR gene editing video is being played, the system may display "guide RNA design" which is a relevant to the segment of the video at the time the segment is being played. In a non-limiting example, while a video about the heart is being played, the system may display contents of relevant concepts, such as stroke volume, cardiac output etc.

In some scenarios, the learning system may also repeat boxes 702, 704, 706 and 708 for multiple video segments of the content items, wherein each video segment may be tagged with one or more concepts. The process 700 may further receive a selection of a topic from a user at 720 and determine a video segment at 722, where the video segment is related to the selected topic. The process 700 may further play the video segment at 724. This may allow the user to "jump into" or begin viewing a video at a selected point in time where the speaker is talking about the set of concepts the user is currently learning.

In some examples, the process may segment a video into one or more video segments and automatically relate one or more concepts to a video segment. For example, the process may use the content items extracted from a video segment, such as a video script, to train a LDA model (as described in the present disclosure), and then use the LDA model to infer a probability of a new video segment to be related to one or more concepts. In training the LDA model, the process may process a content item (e.g., a video segment) frame by frame. In processing the content item, the process may perform noise removal and/or cleaning text or removing non-meaningful content as described in the present disclosure. As the result of the training, each of a video segment in a video may be associated with one or more relevant concepts. In an application scenario, a system implementing the process 700 may facilitate retrieving one or more relevant segments of a video the user wants. For example, the system may find the video segments in which any speaker is talking about a particular combination of topics in the query. In such case, the system may simply retrieve the video segments that are associated with the combination of topics in the query, and play the retrieved video segments.

Figure 8:
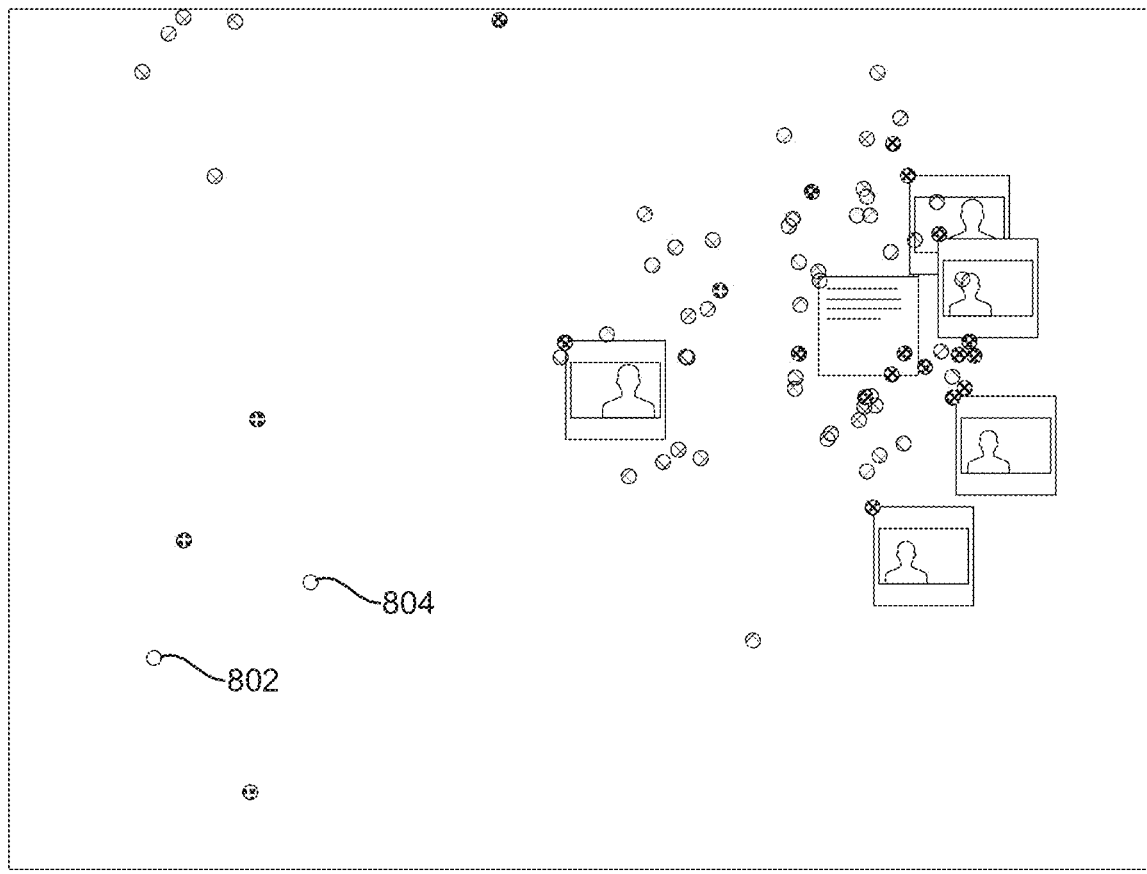
FIG. 8 shows an example application of the various embodiments described in the present disclosure.

FIG. 8 shows an example application of the various embodiments described in the present disclosure. In an example space, nodes 802, 804 represent products and the other colors represent different content. Based on users' performance in the assessment, the system may drive the users toward the products which would be most beneficial to them, and present the right product at the right time, directly to the user. Such data may stimulate an automated marketing email and automated calendar invite for a sales appointment. In other words, the described system may develop a user's skills and performance, and/or additionally individualize product marketing.

Figure 10A:
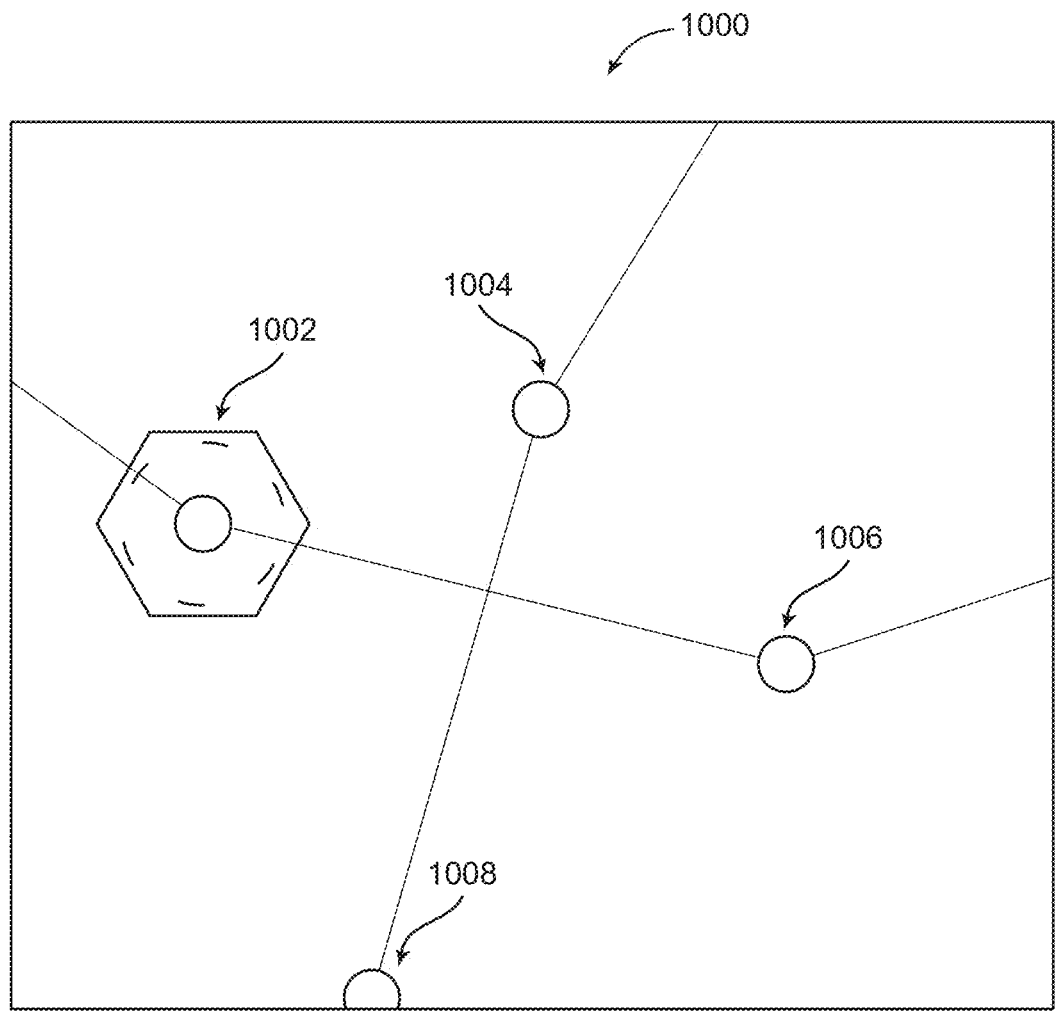
FIGS. 10A-10B shows an example four-concept space and an example heatmap according to some examples described in the present disclosure.
Figure 10B:
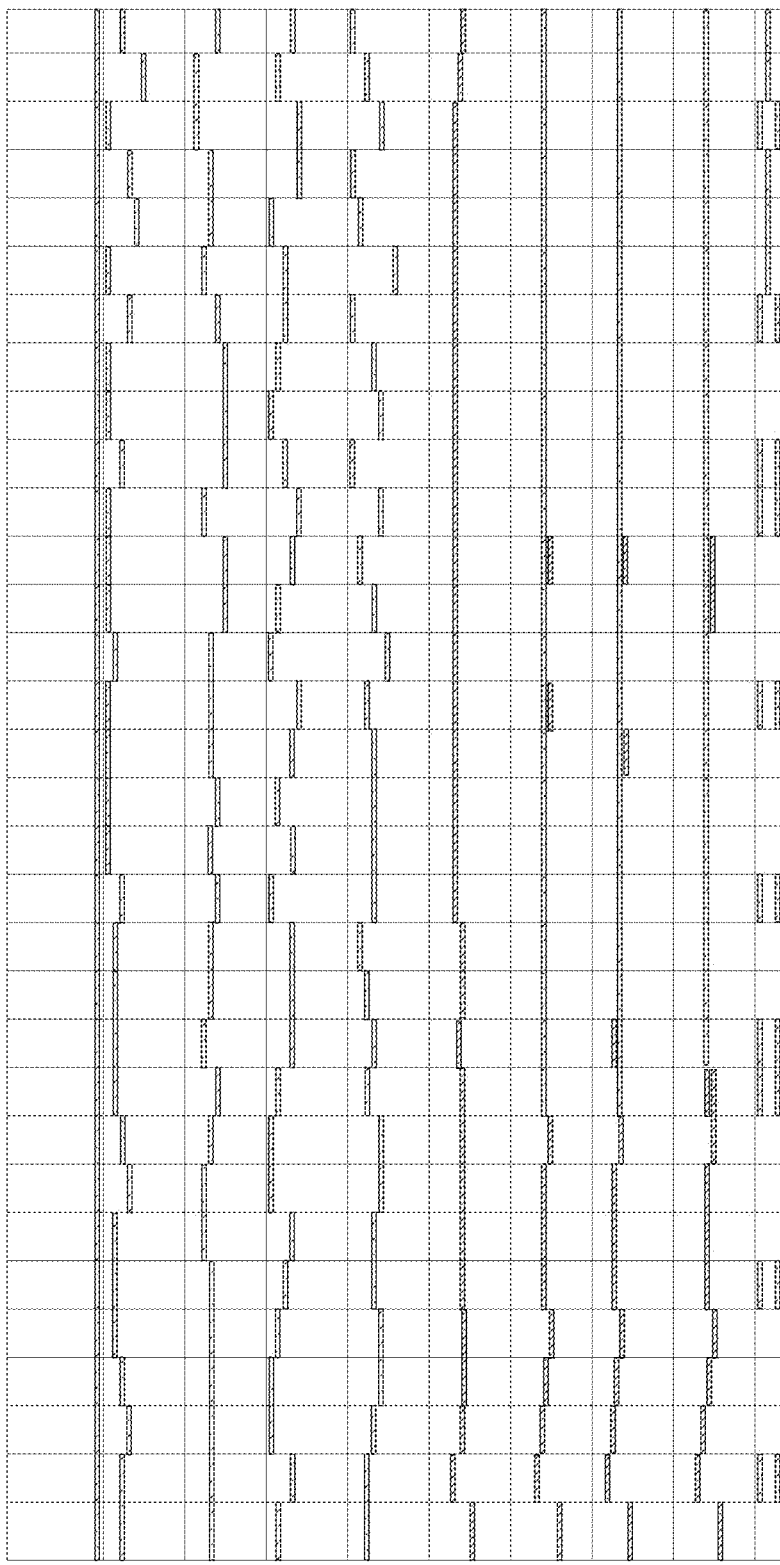
Figure 10C:
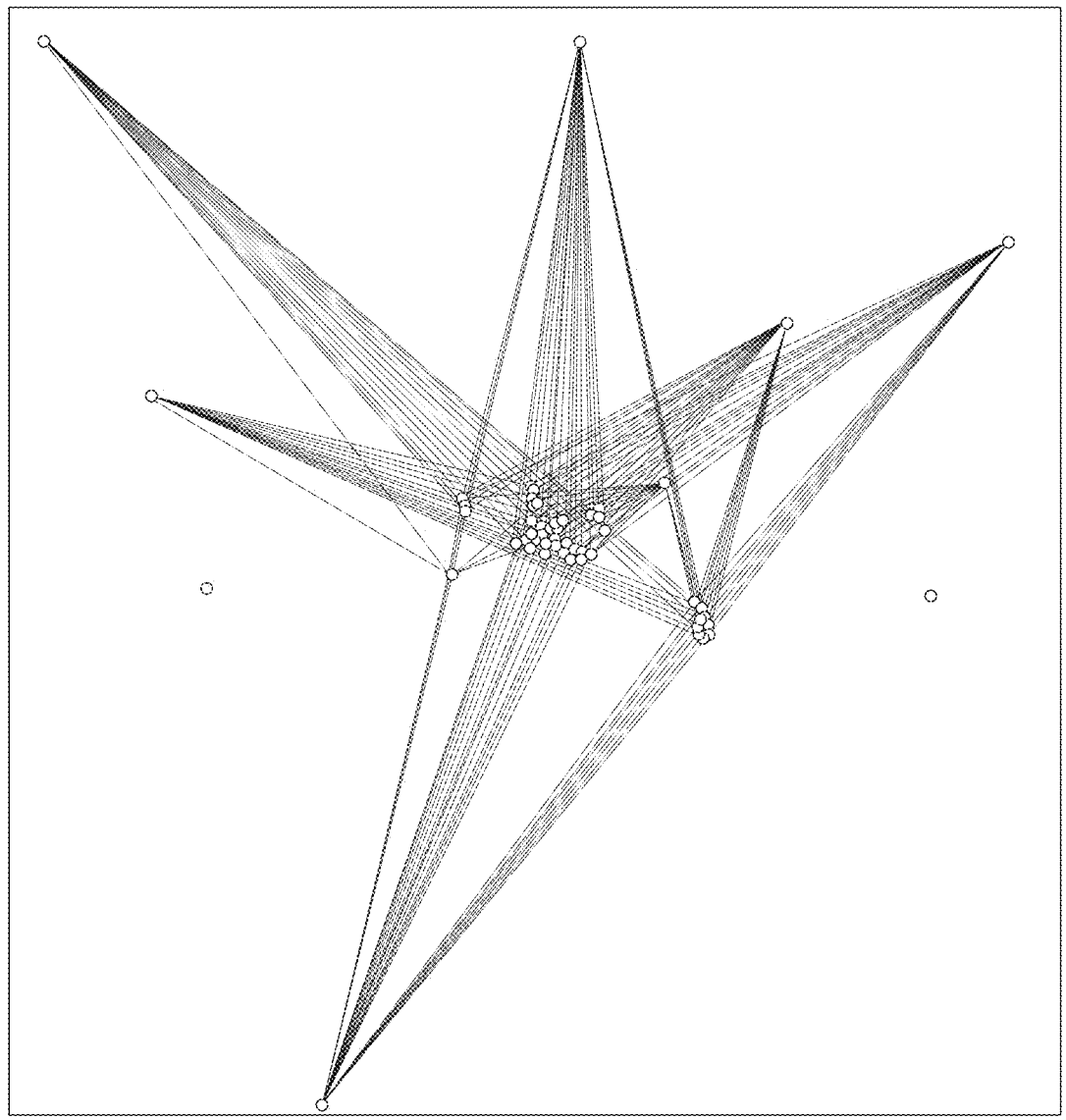
FIG. 10C shows an example of learning space according to some examples described in the present disclosure.

FIGS. 10A-10B shows an example four-concept space and an example heatmap according to some examples described in the present disclosure. For example, FIG. 10A shows concept nodes 1002, 1004, 1006, and 1008 in a 4-concept learning space 1000, in which the edges between nodes represent probability distributions for learning over a sequence of questions in the learning space. FIG. 10B shows an example heatmap for the 4 concepts being tested (in FIG. 10A) that the distributions sharpen and converge on the level of specificity of concepts about which the student has correctly answered questions. FIG. 10C shows an example of learning space according to some examples described in the present disclosure. In this example, learning space shows a seven-dimensional (7D) learning space projected to 2D. As shown, the edges represent dependencies to concepts, the concepts being the outermost points. It is also shown that some clusters of points in the space are nearer to some concepts than others, reflecting their subject areas.

Various embodiments described in FIGS. 1-10 may be implemented to facilitate variations of the learning system (e.g., 100 in FIG. 1). For example, the system may facilitate anomaly detection to detect or flag potential cheating of a user in a testing or remote assessment environment. As another example, the system may facilitate identification or user verification for access, such as access to an online bank account, online insurance portal or other secured element, such as by testing and comparing combinations of a user's answers and confidence levels for security questions (e.g., address, identification information or the like). The system may be configured to analyze various active and passive user assessment variables to generate datasets of individual user profiles and detect anomalies in a future assessment. For example, the system may detect anomalies by comparing the user's profiles with the real-time assessment variables. In another application, the system may generate profiles of the employees based on user assessment variables. The system may use the profiles to track and probe the user performance. This may allow an employer to understand the employee's level of competence around particular topics, and help the employer to identify sub teams as well as which employee might be best suited to which task in the organization. The system may also generate digestible metrics on a user's progress as well as predictions and recommendations for improving learning experience.

Figure 11:
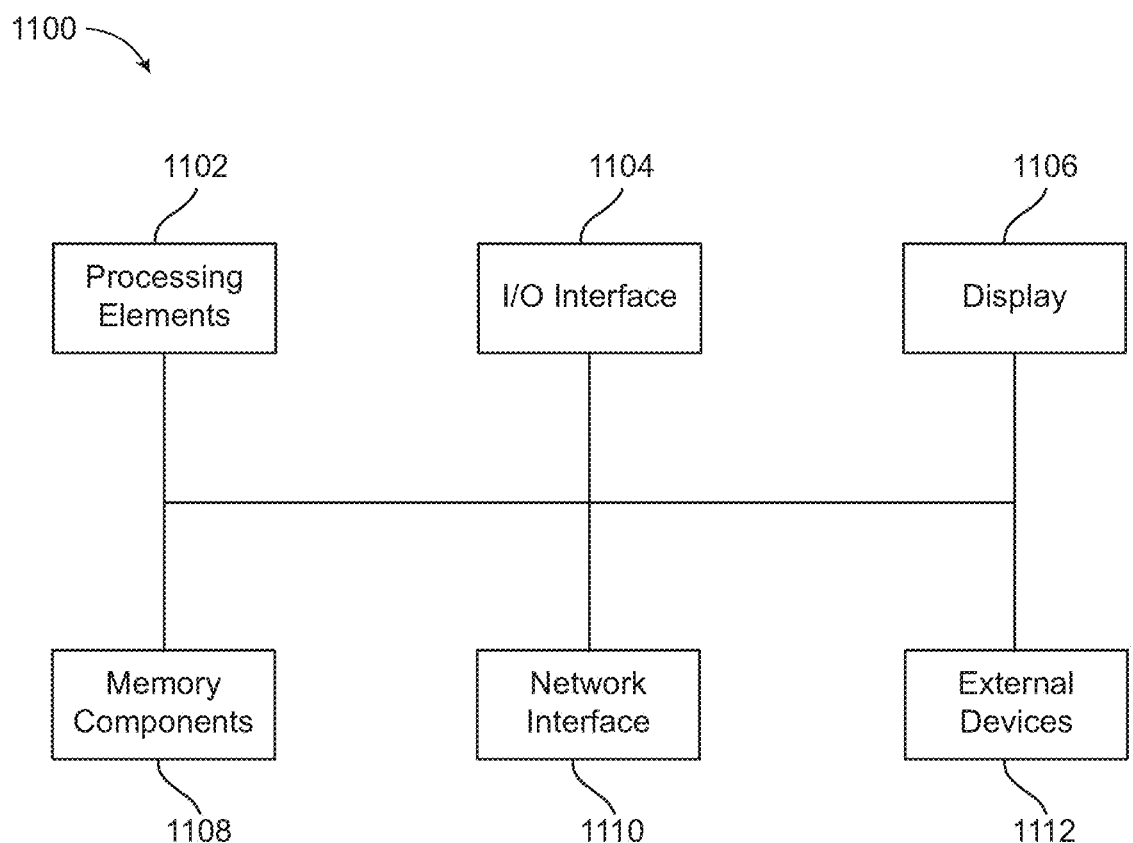
FIG. 11 illustrates an example block diagram of a computing device that can be used to implement various systems and methods described herein.

FIG. 11 shows a simplified block structure for a computing device that may be used with the system 100 (in FIG. 1) or integrated into one or more components of the system. For example, the recommender 110, contextualizer 102, knowledge acquisition unit 118, user knowledge assessor 112, or one or more user devices (not shown) that host the user interface 114 may include one or more of the components shown in FIG. 8 and be used to implement one or more blocks or execute one or more of the components or operations disclosed in FIGS. 1-10. In FIG. 11, the computing device 1100 may include one or more processing elements 1102, an input/output interface 1104, a display 1106, one or more memory components 1108, a network interface 1110, and one or more external devices 1112. Each of the various components may be in communication with one another through one or more busses, wireless means, or the like.

The processing element 1102 may be any type of electronic device capable of processing, receiving, and/or transmitting instructions. For example, the processing element 1102 may be a central processing unit, microprocessor, processor, or microcontroller. Additionally, it should be noted that some components of the computer 1100 may be controlled by a first processor and other components may be controlled by a second processor, where the first and second processors may or may not be in communication with each other.

The memory components 1108 are used by the computer 1100 to store instructions for the processing element 1102, as well as store data, such as the knowledge base (e.g., 300 in FIG. 3A), and the like. The memory components 1108 may be, for example, magneto-optical storage, read-only memory, random access memory, erasable programmable memory, flash memory, or a combination of one or more types of memory components.

The display 1106 provides visual feedback to a user, such as displaying questions or content items or displaying recommended content, as may be implemented in the user interface 114 (FIG. 1). Optionally, the display 1106 may act as an input element to enable a user to control, manipulate, and calibrate various components of the computing device 1100. The display 1106 may be a liquid crystal display, plasma display, organic light-emitting diode display, and/or other suitable display. In embodiments where the display 1106 is used as an input, the display may include one or more touch or input sensors, such as capacitive touch sensors, resistive grid, or the like.

The I/O interface 1104 allows a user to enter data into the computer 1100, as well as provides an input/output for the computer 1100 to communicate with other devices or services (e.g., recommender 110 in FIG. 1). The I/O interface 1104 can include one or more input buttons, touch pads, and so on.

The network interface 1110 provides communication to and from the computer 1100 to other devices. For example, the network interface 1110 allows the recommender 110 to communicate with the knowledge base 106 or 108 via a communication network (in FIG. 1). The network interface 1110 includes one or more communication protocols, such as, but not limited to WiFi, Ethernet, Bluetooth, and so on. The network interface 1110 may also include one or more hardwired components, such as a Universal Serial Bus (USB) cable, or the like. The configuration of the network interface 1110 depends on the types of communication desired and may be modified to communicate via WiFi, Bluetooth, and so on.

The external devices 1112 are one or more devices that can be used to provide various inputs to the computing device 1100, e.g., mouse, microphone, keyboard, trackpad, or the like. The external devices 1112 may be local or remote and may vary as desired. In some examples, the external devices 1112 may also include one or more additional sensors, such as sensor(s) 116 (in FIG. 1) that may be used in obtaining user's assessment variables.

The foregoing description has a broad application. For example, while examples disclosed herein may focus on central communication system, it should be appreciated that the concepts disclosed herein may equally apply to other systems, such as a distributed, central or decentralized system, or a cloud system. For example, recommender 110, or other components (in FIG. 1) may be residing on a server in a client/server system. The recommender may also be residing on any device on the network and operate in a decentralized manner. The recommender may also be residing in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

Various embodiments described in FIGS. 1-11 provide technical solutions that provide technical effects advantageous over existing solutions. For example, the recommender (110 in FIG. 1) runs efficiently by using a factor graph to represent the knowledge base, which can be used to store the topics, concepts, words and documents of content items as nodes and the relationships between the nodes. This facilitates easy conversion from the probability model of the content items and also easy propagation (search) in the knowledge base. The propagation of the knowledge base may be configured to achieve various goals for the user, such as achieving maximum success rate in certain areas where the user shows high ability, or improving user's ability in certain concepts where the user shows weakness. A portion of the knowledge base may also be made sharable or exchangeable to other organizations.

When used in combination with contextualization and other components, the system allows more data per click or per answers/per interaction than conventional systems. As a result, the system can be tuned to be more effective and precise and the computer operates more efficiently. These performance gains allow content and data assets (e.g., knowledge base) to be found and served more efficiently. For example, in addition to penalizing guessing by the user, the system may detect and flag guessing and cheating on assessments based on confidence and contextual dependencies. For example, the system may keep track of the user's performance in a user profile, and compare the user's performance in any given test with the user profile. If the system detects a significant increase in the user's performance during a test in a particular category, the system may determine that the user is likely cheating. Alternatively, and/or additionally, if the user receives a significant penalty during a test, the system may determine that the user is guessing.

In some examples, the systems and processes described in the present disclosure may allow users to depart from the most system recommended route and to optionally visit content in other conceptual dimensional of the knowledge space. For example, the system may allow the user to navigate the knowledge base manually, instead of exclusively recommending contents to the user or semi-manually. For example, the system may include a hybrid of user choice and machine recommendation. Alternatively, the system may display the concepts the user is good at or the concepts the user needs improvement. The user may select the recommend route in the concepts the user is good at, or alternatively, ignore the recommend route and select concepts where the user needs improvement.

Once a user selects a new conceptual area to visit, the system may set the user profile to be "expert" in the new selected conceptual dimension. For example, the system may place the user in an area of content with mid-high specificity area for a chosen concept. In some examples, to prevent altering the user's profile when a user departs from the system recommended path, the mimicked performance (e.g., as expert) of the user is not recorded. Instead, all of the user's existing data and profile remain unaltered. Only once the user begins interacting with the content in the new area of the knowledge space is their user profile updated accordingly.

In some examples, the adaptive learning system may determine that the user has reached a passing event for a concept in (e.g., a threshold) so that the user can switch to studying contents in a different concept. The system may determine a passing threshold for each concept and for the entire learning space, based on analysis of the learning space itself and/or data from all of the users of a given learning space. In determining the threshold, the system may automatically calculate a passing grade for each concept. Traditionally, a passing threshold may be determined in proportion to the number of questions answered correctly. This has drawbacks because the number of questions answered per user may be very different in adaptive learning, and the amount of content and data per concept might vary significantly in knowledge spaces/adaptive learning paradigms.

To address the aforementioned drawbacks, in some examples, the system integrates a measure of 'user performance per concept,' which includes combinatorial data on their correctness, confidence, time to answer and other metrics. Optionally, the user performance per concept may be then 'normalized' to the amount and specificity of content. In some examples, the user performance per concept may be represented as a percentage (%). Additionally, the system may set different passing thresholds for different concepts and/or different users. In a scenario, once the passing threshold is reached, the user is switched to a different concept (referred to as 'teleported'). For example, the system may switch to a nearest neighboring concept dimension as described above. In some examples, the system may use a weighting/model adjustment in switching the concepts, which prevents the model from pulling back towards previously passed concepts. Once the selected concepts are passed the system may award the user a digital certificate.

In some examples, the system may crowd source the creation of assessments from all of the users on the platform. This is useful for quick generation of assessment materials, however, controlling the quality and suitability/appropriateness of assessments becomes a challenge at this scale. To ensure that user generated questions appropriately address the content relevant to the questions, the user proposed text is analyzed against the corpus which it is meant to be about using contextualization. As described above, the contextualization may be performed incrementally as new contents become available, without re-contextualizing the previous contents. In some examples, if the contextualized concept is significantly different/distant from the questions, then the questions may be deemed to be unrelated or not specific enough and not published in the knowledge base. If the system determines that the concept is relevant to the questions presented by the user, the system may publish the content in the knowledge base. This is referred to as auto-moderation. Auto-moderation prevents unrelated questions from being published to a knowledge space. Auto-moderation may also prevent potentially offensive language or content being published. In some examples, the system may use any security measures, such as user name/password, authentication scheme etc., to allow an authorized user (e.g., a manager) to make decision about which content to publish.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary. In each of the figures, like numerals represent like items throughout the figures.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications and combinations may be made without deviating from the spirit and scope of the present disclosure. For example, although various embodiments are described to use LDA model training, non-LDA based methods may also be used. In such case, the system may take into account all the distances, instead of using a fixed window and counting frequency of co-occurrence in that window. The system may take into account all windows in all words and distances that are found relative to the other words. The systems and methods described herein may also be applied to other recommendation applications. It may be appreciated that various modifications to the disclosure may be readily apparent, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of delivering educational content to a user, the method comprising:
   accessing a first content item of a plurality of content items based on a knowledge base, the knowledge base including a graph structure with a plurality of nodes associated with the plurality of content items;
providing the first content item to a user on a display;
receiving one or more user assessment variables based on a response of the user to the first content item;
generating a user model based on the one or more user assessment variables;
determining a node in the knowledge base by using the user model to navigate the knowledge base;
recommending a second content item of the plurality of content items based on the node in the knowledge base;
accessing the second content item represented by the node; and
displaying the second content item on the display.

2. The method of claim 1, wherein the plurality of content items are stored in a content database, the method further comprising:
accessing the content database to generate the knowledge base based on the content database.

3. The method of claim 2, further comprising:
accessing the plurality of content items from the content database;
forming a corpus based on the plurality of content items;
generating a probability model of the content items; and
using the probability model to generate the knowledge base by:
generating one or more of the plurality of nodes of the knowledge base, each node of the plurality of nodes representing a topic; and
generating edges amongst the plurality of nodes of the graph structure, each edge connecting a respective first node and second node of the plurality of nodes, each edge including a weight representing a probability of the respective first node and second node belonging to a same concept.

4. The method of claim 3, wherein the probability model is a latent Dirichlet allocation (LDA) model.

5. The method of claim 1, wherein recommending the second content item further comprises:
determining the second content item from a plurality of candidate content items, wherein the second content item is associated with a maximum probability of success among the candidate content items, and wherein the probability of success associated with a respective content item represents a probability that the user will respond to the respective content item correctly.

6. The method of claim 1, wherein the first content item is a portion of a video segment, the method further comprising:
determining one or more concepts within the video segment; and
mapping a concept of the one or more concepts to a time interval of the video segment, wherein the time interval of the video segment defines the portion of the video segment.

7. The method of claim 6, wherein the first content item is associated with the concept, wherein accessing the first content item comprises accessing the portion of the video segment based on the time interval mapped to the concept.

8. A recommender system comprising:
a processing device; and
computer readable medium containing programming instructions that, when executed, will cause the processing device to:
access a knowledge base;
obtain one or more user assessment variables;
generate a user model based on the one or more user assessment variables;
use the user model to navigate the knowledge base to determine a node in the knowledge base;
access a content item represented by the determined node; and
recommend the content item for display to a user device;
update the user model based on an input from a user associated with the user device;
navigating the knowledge base to determine a second node based on the user model;
access a second item represented by the second node; and
present the second content item to the user device.

9. The recommender system of claim 8, wherein the knowledge base includes a graph structure with a plurality of nodes including the node, the plurality of nodes representing a plurality of content items including the content item.

10. The recommender system of claim 9, wherein the graph structure further includes edges amongst the plurality of nodes of the graph structure, wherein each edge connects a respective first node and second node of the plurality of nodes, each edge including a weight representing a probability of the respective first node and second node belonging to the same concept.

11. The recommender system of claim 8, wherein the user model is a model of a state of the user, the state of the user including a plurality of states corresponding to the user assessment variables.

12. The recommender system of claim 8, wherein updating the user model based on the input from the user associated with the user device comprises:
presenting the content item to the user device; and
updating the user model based on input from the user while the content item is presented to the user device.

13. The recommender system of claim 12, wherein the instructions further cause the processing element to update the user model based on one or more engagement characteristics detected from the input from the user while the user engages with the content item.

14. The method of claim 1, wherein the user model is a model of a state of the user, the state of the user including a plurality of states corresponding to the user assessment variables.

15. A recommender system comprising:
a processing device; and
computer readable medium containing programming instructions that, when executed, will cause the processing device to:
access a knowledge base;
obtain one or more user assessment variables;
generate a user model based on the one or more user assessment variables, wherein the user model is a model of a state of a user, the state of the user including a plurality of states corresponding to the user assessment variables;
use the user model to navigate the knowledge base to determine a node in the knowledge base;
access a content item represented by the determined node;
recommend the content item;
present the content item to a user device associated with the user;
update the user model based on input from the user while the content item is presented to the user device;

use the updated user model to navigate the knowledge base to determine a second node in the knowledge base;

access a second item represented by the second node; and present the second content item to the user device.

16. A method of delivering educational content to a user, the method comprising:

displaying, at a user interface, a first content item of a plurality of content items, the first content item being represented by a first node of a plurality of nodes in a knowledge base, the plurality of nodes in the knowledge base representing the plurality of content items;

determining, from user input received at the user interface during the display of the first content item, one or more user assessment variables;

updating a user model using the one or more user assessment variables wherein the user model is representative of a user knowledge of concepts;

determining a second node of the plurality of nodes in the knowledge by using the updated user model to navigate the knowledge base; and displaying, at the user interface, a second content item being represented by the second node.

17. The method of claim 16, wherein the input received at the user interface includes a reported confidence of the user in answering a question of the first content item.

18. The method of claim 17, wherein the reported confidence is provided via a slider provided at the user interface.

19. The method of claim 16, wherein the user model is further updated based on one or more engagement characteristics detected from the input from the user while the user engages with the content item.

* * * * *